United States Patent
Moon et al.

(10) Patent No.: US 11,017,783 B2
(45) Date of Patent: May 25, 2021

(54) SPEAKER TEMPLATE UPDATE WITH EMBEDDING VECTORS BASED ON DISTANCE METRIC

(71) Applicant: QUALCOMM Incorporated, San Diego, CA (US)

(72) Inventors: Sunkuk Moon, San Diego, CA (US); Bicheng Jiang, New York, NY (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 16/296,733

(22) Filed: Mar. 8, 2019

(65) Prior Publication Data

US 2020/0286491 A1   Sep. 10, 2020

(51) Int. Cl.

| | |
|---|---|
| *G10L 17/04* | (2013.01) |
| *G10L 17/08* | (2013.01) |
| *G10L 17/18* | (2013.01) |
| *G10L 17/22* | (2013.01) |
| *G10L 17/06* | (2013.01) |
| *G10L 17/02* | (2013.01) |
| *G10L 17/00* | (2013.01) |

(52) U.S. Cl.
CPC .............. *G10L 17/22* (2013.01); *G10L 17/00* (2013.01); *G10L 17/02* (2013.01); *G10L 17/04* (2013.01); *G10L 17/06* (2013.01)

(58) Field of Classification Search
CPC ....... G10L 15/06; G10L 15/065; G10L 15/07; G10L 15/10; G10L 15/16; G10L 17/04; G10L 17/08; G10L 17/18; G10L 2015/0635; G10L 2015/0636

USPC ....... 704/232, 236, 238, 244, 245, 246, 250, 704/243

See application file for complete search history.

(56) References Cited

U.S. PATENT DOCUMENTS

| | | | | |
|---|---|---|---|---|
| 5,617,486 | A * | 4/1997 | Chow | G10L 15/063 704/244 |
| 9,530,417 | B2 * | 12/2016 | Kurniawati | G10L 17/04 |
| 10,325,602 | B2 * | 6/2019 | Sak | G10L 17/04 |
| 10,381,009 | B2 * | 8/2019 | Khoury | G10L 17/04 |
| 10,685,008 | B1 * | 6/2020 | Kurve | G10L 17/04 |
| 2011/0213615 | A1 * | 9/2011 | Summerfield | G10L 17/04 704/246 |

(Continued)

*Primary Examiner* — Martin Lerner
(74) *Attorney, Agent, or Firm* — Moore Intellectual Property Law, PLLC

(57) ABSTRACT

A device includes a processor configured to determine a feature vector based on an utterance and to determine a first embedding vector by processing the feature vector using a trained embedding network. The processor is configured to determine a first distance metric based on distances between the first embedding vector and each embedding vector of a speaker template. The processor is configured to determine, based on the first distance metric, that the utterance is verified to be from a particular user. The processor is configured to, based on a comparison of a first particular distance metric associated with the first embedding vector to a second distance metric associated with a first test embedding vector of the speaker template, generate an updated speaker template by adding the first embedding vector as a second test embedding vector and removing the first test embedding vector from test embedding vectors of the speaker template.

28 Claims, 10 Drawing Sheets

(56) References Cited

U.S. PATENT DOCUMENTS

| | | | |
|---|---|---|---|
| 2014/0244257 A1* | 8/2014 | Colibro | G10L 17/12 |
| | | | 704/246 |
| 2015/0301796 A1* | 10/2015 | Visser | G10L 15/22 |
| | | | 715/728 |
| 2018/0174600 A1* | 6/2018 | Chaudhuri | G10L 17/04 |
| 2019/0156837 A1* | 5/2019 | Park | G10L 17/18 |
| 2019/0318722 A1* | 10/2019 | Bromand | G10L 15/07 |
| 2019/0341058 A1* | 11/2019 | Zhang | G10L 17/04 |
| 2020/0125820 A1* | 4/2020 | Kim | G10L 17/04 |
| 2020/0219517 A1* | 7/2020 | Wang | G10L 17/04 |

\* cited by examiner

Enrollment Period 802

Verification Period 804

SPEAKER TEMPLATE UPDATE WITH EMBEDDING VECTORS BASED ON DISTANCE METRIC

I. FIELD

The present disclosure is generally related to speaker verification based on a speaker template.

II. DESCRIPTION OF RELATED ART

Advances in technology have resulted in smaller and more powerful computing devices. For example, there exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A computing device may be used to access sensitive information, such as bank accounts or personal email. A password may be used to access the computing device or to access a particular application of the computing device. Security of the communication device may be compromised if an unauthorized user has (or guesses) the password. Manually entering a password may also be inconvenient for a user in some situations (e.g., while driving a car). User verification based on speech as an alternative to, or in addition to, a text password improves security of the computing device. Speech recognition is generally based on a large number of trusted speech samples from an authorized user. Providing the large number of speech samples during an enrollment process to enable speech recognition can adversely impact user experience.

III. SUMMARY

In a particular aspect, a device includes a processor coupled to a memory. The memory is configured to store a trained embedding network. The memory is also configured to store a speaker template associated with a particular user. The speaker template includes one or more enrollment embedding vectors based on initial user enrollment data. The speaker template also includes one or more test embedding vectors. The processor is configured to determine a first feature vector based on a first utterance. The processor is also configured to determine a first embedding vector based on the first feature vector by processing the first feature vector using the trained embedding network. The processor is further configured to determine a first distance metric based on distances between the first embedding vector and each embedding vector of the speaker template. The processor is also configured to perform a speaker verification operation to determine, based on the first distance metric, whether the first utterance is verified to be from the particular user. The processor is further configured to, based on determining that the first utterance is verified to be from the particular user, perform a comparison of a first particular distance metric associated with the first embedding vector to a second distance metric associated with a first test embedding vector of the speaker template. The processor is also configured to, based on the comparison, generate an updated speaker template by adding the first embedding vector as a second test embedding vector and removing the first test embedding vector from the test embedding vectors of the speaker template.

In another particular aspect, a method of user verification includes determining, at a device, a first feature vector based on a first utterance. The method also includes determining, at the device, a first embedding vector based on the first feature vector by processing the first feature vector using a trained embedding network. The method further includes determining, at the device, a first distance metric based on distances between the first embedding vector and each embedding vector of a speaker template associated with a particular user. The speaker template includes one or more enrollment embedding vectors based on initial user enrollment data and includes one or more test embedding vectors. The method also includes determining, at the device, that the first utterance is verified to be from the particular user based on determining that the first distance metric satisfies a speaker verification threshold. The method further includes, based on determining that the first utterance is verified to be from the particular user, performing a comparison of a first particular distance metric associated with the first embedding vector to a second distance metric associated with a first test embedding vector of the speaker template. The method also includes, based on the comparison, generating an updated speaker template by adding the first embedding vector as a second test embedding vector and removing the first test embedding vector from the test embedding vectors of the speaker template.

In another particular aspect, a computer-readable storage device stores instructions that, when executed by a processor, cause the processor to perform operations including determining a first feature vector based on a first utterance. The operations also include determining a first embedding vector based on the first feature vector by processing the first feature vector using a trained embedding network. The operations further include determining a first distance metric based on distances between the first embedding vector and each embedding vector of a speaker template associated with a particular user. The speaker template includes one or more enrollment embedding vectors based on initial user enrollment data. The speaker template also includes one or more test embedding vectors. The operations also include performing a speaker verification operation to determine, based on the first distance metric, whether the first utterance is verified to be from the particular user. The operations further include, based on determining that the first utterance is verified to be from the particular user, performing a comparison of a first particular distance metric associated with the first embedding vector to a second distance metric associated with a first test embedding vector of the speaker template. The operations also include, based on the comparison, generating an updated speaker template by adding the first embedding vector as a second test embedding vector and removing the first test embedding vector from the test embedding vectors of the speaker template.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
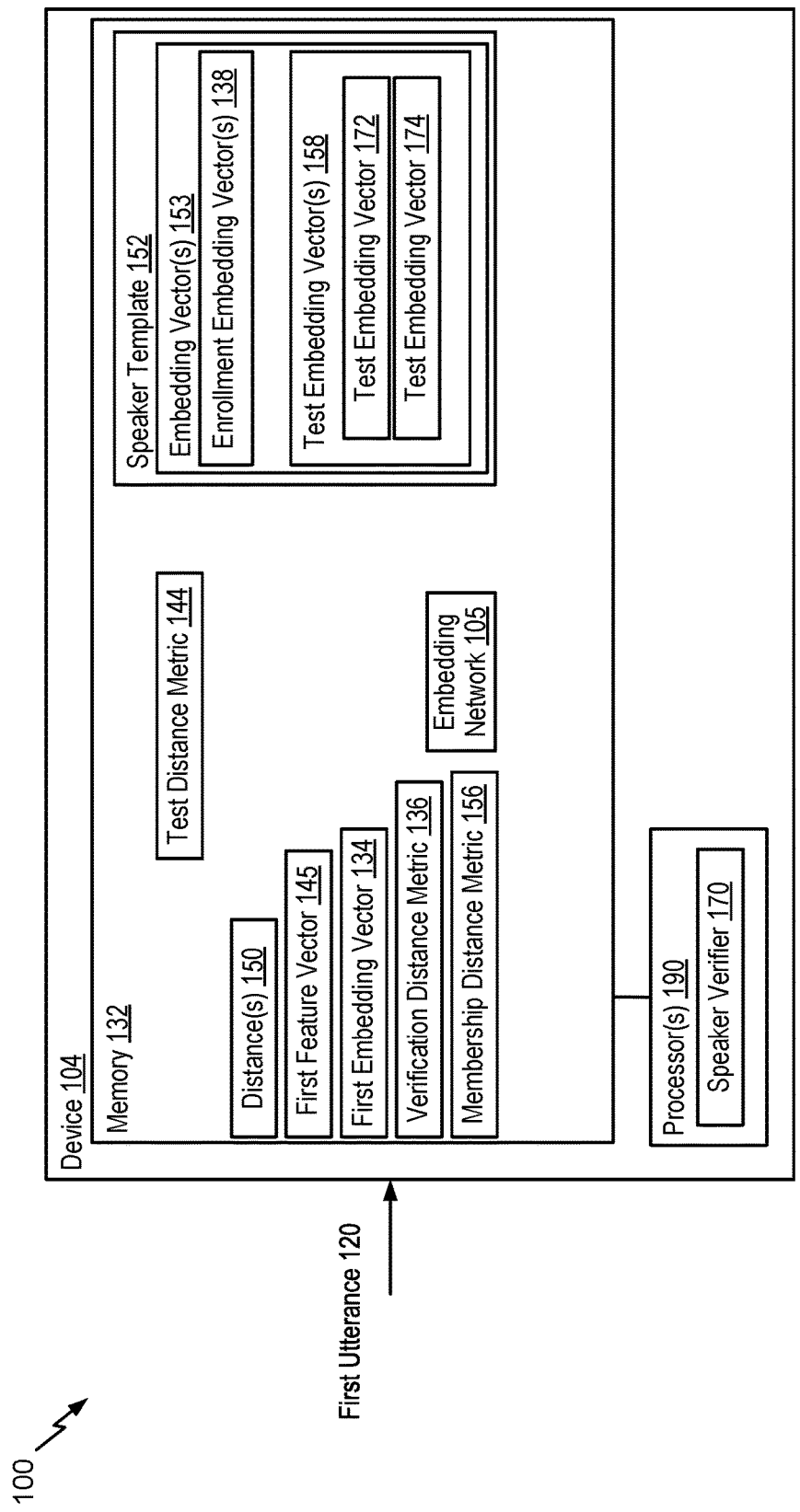
FIG. 1 is a block diagram of a particular illustrative example of a system operable to perform speaker verification based on a speaker template.

Systems and methods of performing speaker verification are disclosed. For example, a system includes a classification network trainer that is configured to generate a classification network (e.g., a classification neural network) by processing training data. The training data includes a relatively large number of utterances from a variety of users (e.g., from a voice sample database). A classification network generally includes a plurality of layers, e.g., an input layer, one or more hidden layers, and a speaker identification layer. For example, the input layer is coupled to a first hidden layer, and a second hidden layer is coupled to the speaker identification layer. In some examples, the classification network includes one or more hidden layers between the first hidden layer and the second hidden layer. Each node of the input layer provides a particular input value to each of the nodes of the first hidden layer. Each node of a particular hidden layer generates an output value based on a weighted combination of input values of the node. Each node of the second hidden layer (e.g., an embedding layer) provides an output value to each node of the speaker identification layer. Each node of the speaker identification layer generates an output value based on a weighted combination of input values of the node. The output values of the nodes of the speaker identification layer indicate a speaker identifier.

The classification network is trained to receive a plurality of feature values (e.g., mel frequency cepstral coefficients (MFCCs)) extracted from an utterance of a particular user and generate a particular output identifying the particular user. Training the classification network to generate a speaker identifier to indicate the particular user uses a relatively large number of utterances of the particular user. Having an authorized user provide the relatively large number of utterances can adversely impact user experience. Training the classification network based on the large number of utterances can also be expensive in terms of time, processing cycles, and memory usage.

An embedding network trainer generates an embedding network by removing the speaker identification layer from the trained classification network. For example, the embedding network includes the input layer and the one or more hidden layers (e.g., the first hidden layer and the embedding layer). The embedding network is configured to receive a plurality of feature values (e.g., MFCCs) extracted from (or determined based on) an utterance of a particular user and generate particular output values of the embedding layer. The particular output values correspond to an "embedding vector". For example, the embedding vector includes n values, where 'n' is a count of the particular output values, a count of nodes of the embedding layer, or both. Conceptually, the embedding vector represents a point in n-dimensional space. In some examples, the embedding network trainer trains the embedding network to improve accuracy of the embedding network. For example, the embedding network is trained, as described herein, to generate an embedding vector such that the embedding vector is closer (in the n-dimensional space) to other embedding vectors corresponding to utterances of the same user as compared to embedding vectors corresponding to utterances of a different user.

In a particular aspect, a device includes a speaker verifier. In some examples, the device receives (e.g., downloads) the trained embedding network, the speaker verifier, or both, from a second device (e.g., a server). The speaker verifier uses the trained embedding network to perform speaker verification. For example, during an enrollment period, the speaker verifier receives a plurality of utterances from an authorized user. The speaker verifier, based on the plurality of utterances, generates a speaker template associated with the authorized user. For example, the speaker template is representative of speech of the authorized user. To illustrate, the speaker verifier generates an enrollment embedding vector by using the embedding network to process an utterance received during the enrollment period. The speaker verifier initializes the speaker template to include enrollment embedding vectors corresponding to the plurality of utterances received during the enrollment period. The enrollment embedding vectors correspond to a trusted set of embedding vectors that are associated with a relatively high confidence of being based on utterances of the authorized user.

In some aspects, the speaker template can be initialized using fewer voice samples from the authorized user than would be used to train a reliable classification network. For example, to improve user experience, the enrollment period for initializing the speaker template may be of a short duration with the authorized user requested to speak relatively few phrases.

After the speaker template is initialized, the speaker verifier can update the speaker template based on new voice samples from the user. For example, the speaker verifier is configured to, during a verification period that is subsequent to the enrollment period, update the speaker template based on utterances that are verified to be from the authorized user. In this example, the speaker verifier uses the embedding network to generate an embedding vector corresponding to an utterance received during the verification period. The speaker verifier, in response to determining that the embedding vector is close to (e.g., less than a threshold distance from) the embedding vectors of the speaker template, determines that the utterance is verified to be from the authorized user. The speaker verifier, based at least in part on determining that the utterance is verified to be from the authorized user, adds the embedding vector as a test embedding vector to the speaker template. In a particular aspect, the speaker verifier, in response to determining that the utterance is verified to be from the authorized user, enables access (e.g., continued access) to the device 104, a particular application, a particular service, a particular file, or a combination thereof.

After the speaker template is updated, the speaker template includes one or more test embedding vectors. The test embedding vectors are associated with a lower confidence of being associated with the authorized user as compared to the enrollment embedding vectors. When the test embedding vectors are associated with the authorized user, the test embedding vectors improve a robustness of the speaker template of the authorized user. For example, having a greater count of embedding vectors associated with the authorized user in the speaker template increases accuracy of speaker verification.

The speaker verifier is configured to, at various times, compare a test embedding vector to the enrollment embedding vectors. In a particular example, the speaker verifier, in response to determining that the test embedding vector is far (e.g., greater than a threshold distance) from the enrollment embedding vectors, generates an alert indicating that re-enrollment of the authorized user is to be requested, removes the test embedding vectors from the speaker template, or both. Re-enrollment of the authorized user is thus initiated when a test embedding vector is too far (in the n-dimensional space) from the enrollment embedding vectors. For example, the test embedding vector may be too far (e.g., greater than a threshold distance) from the enrollment embedding vectors because the test embedding vector is associated with an unauthorized user or because the authorized user is experiencing voice changes (e.g., due to catching a cold) subsequent to the enrollment period.

Using a trained embedding network enables the speaker verification to be performed based on speech of an authorized user with relatively few initial voice samples from the user collected during enrollment of the user. Initializing the speaker template based on enrollment embedding vectors improves user experience by requesting the authorized user to provide relatively few enrollment utterances as compared to a number of utterances that would be used to train a reliable classification network to recognize speech of the authorized user. Accuracy of speaker verification based on the speaker template is increased by adding test embedding vectors to the speaker template that are verified to be from the authorized user. At least some of the test embedding vectors are compared with the enrollment embedding vectors at various times to ensure that the speaker template maintains an accurate representation of the speech of the authorized user.

Referring to FIG. 1, a particular illustrative aspect of a system operable to perform speaker verification is shown and generally designated 100. The system 100 includes a device 104. The device 104 includes one or more processors 190 coupled to a memory 132. The processors 190 include a speaker verifier 170.

It should be noted that in the following description, various functions performed by the system 100 of FIG. 1 are described as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The memory 132 is configured to store an embedding network 105 (e.g., a trained embedding network). For example, the embedding network 105 is generated and trained, as further described with reference to FIGS. 3-6. The speaker verifier 170 is configured to determine a "feature vector" based on an utterance. For example, the feature vector indicates m values (e.g., feature vector=$(a_1, a_2, \ldots, a_m)$). Conceptually, the feature vector corresponds to a point in an m-dimensional space. In a particular aspect, a particular value (e.g., $a_p$) of the m values corresponds to a particular feature value (e.g., a particular mel frequency cepstral coefficient (MFFC) value) extracted from (or determined based on) the utterance.

The speaker verifier 170 is configured to determine an "embedding vector" based on the feature vector by processing the feature vector using the embedding network 105, as further described with reference to FIG. 4. For example, the embedding vector indicates n values (e.g., embedding vector=$(e_1, e_2, \ldots, e_n)$). In a particular aspect, a particular value (e.g., $e_p$) of the n values corresponds to a particular output value of a particular node of an embedding layer of the embedding network 105, as further described with reference to FIG. 4. In a particular aspect, a first count (e.g., m) of features extracted from an utterance is equal to a second count (e.g., n) of nodes of the embedding layer of the embedding network 105. In an alternate aspect, the first count (e.g., m) is not equal to the second count (e.g., n).

The speaker verifier 170 is configured to detect an "enrollment period." For example, the speaker verifier 170 is configured to, in response to detecting a first event, detect that an enrollment period has started. In a particular aspect, detecting the first event includes detecting activation, at a first time, of a particular application at the device 104 and determining that speaker enrollment has not been performed for an authorized user (e.g., a logged-in user) within a particular duration of the first time. In a particular aspect, detecting the first event includes receiving user input (e.g., a user selection of an option) indicating that speaker enrollment is to be performed.

In a particular aspect, the speaker verifier 170 is configured to, in response to detecting a second event, detect that the enrollment period has ended. In a particular aspect, detecting the second event includes detecting deactivation (e.g., shutdown) of a particular application, the device 104, or both. In a particular aspect, detecting the second event includes receiving user input (e.g., a user selection of an option) indicating that speaker enrollment is to be stopped. In a particular aspect, detecting the second event includes determining that a "speaker template" associated with an authorized user (e.g., a logged-in user) includes at least a threshold number of enrollment embedding vectors.

The speaker verifier 170 is configured to, during an enrollment period, add the embedding vector as an "enrollment embedding vector" to a speaker template 152 associated with an authorized user, as further described with reference to FIG. 4. An enrollment embedding vector is based on an utterance received during the enrollment period. The enrollment embedding vector is associated with a relatively high confidence of corresponding to speech of the authorized user. In a particular example, the speaker template 152 includes one or more enrollment embedding vectors 138. The enrollment embedding vectors 138 are based on initial user enrollment data associated with the authorized user, as described with reference to FIG. 4. In a particular aspect, the speaker template 152 includes one or more embedding vectors 153. The embedding vectors 153 include the enrollment embedding vectors 138.

The speaker verifier 170 is configured to detect a "verification period." For example, the speaker verifier 170 is configured to detect a start of the verification period in response to detecting a first particular event, to detect an end of the verification period in response to detecting a second particular event, or both. In a particular aspect, detecting the first particular event includes detecting activation of a first application (e.g., a secure-access application) and determining that a configuration setting has a particular value (e.g., 1) indicating that speaker verification is activated. In this aspect, detecting the second particular event includes detecting deactivation of the first application. In a particular aspect, detecting the first particular event includes detecting activation of the speaker verifier 170 and determining that a count of the enrollment embedding vectors 138 is greater than or equal to a threshold number of enrollment embedding vectors. In this aspect, detecting the second particular event includes detecting deactivation of the speaker verifier 170. In a particular implementation, detecting the second particular event includes determining that an utterance corresponding to an unauthorized user has been received.

The speaker verifier 170 is configured to, during a verification period, perform a speaker verification operation based on an embedding vector to determine whether an utterance is verified to be from the authorized user, as described herein. For example, the speaker verifier 170 is configured to generate a feature vector corresponding to the utterance and generate an embedding vector by using the embedding network 105 to process the feature vector. The speaker verifier 170 is configured to, based on a comparison of the embedding vector and each embedding vector of the speaker template 152, determine whether the utterance is verified to be from the authorized user. In some implementations, the speaker verifier 170 is also configured to, based at least in part on determining that the utterance is verified to be from the authorized user, add the embedding vector as a test embedding vector to the speaker template 152. In a particular aspect, the speaker verifier 170 is configured to, in response to determining that the utterance is verified to be from the authorized user, enable access (e.g., continued access) to the device 104, a particular application, a particular service, a particular file, or a combination thereof.

During operation, the speaker verifier 170 detects a verification period that is subsequent to an initial enrollment period. For example, the speaker verifier 170 detects a start of a verification period based at least in part on detecting an activation of the speaker verifier 170. To illustrate, the speaker verifier 170 detects the start of the verification period in response to detecting the activation of the speaker verifier 170, determining that the speaker template 152 is associated with an authorized user (e.g., a user identifier of a logged-in user), and determining that a count of the enrollment embedding vectors 138 satisfies a count threshold. In a particular aspect, the enrollment embedding vectors 138 are generated during the initial enrollment period, as further described with reference to FIG. 7.

The speaker verifier 170 receives a first utterance 120 (e.g., an audio input) during the verification period. The speaker verifier 170 generates a first feature vector 145 based on the first utterance 120. The first feature vector 145 includes m values which together represent features of the first utterance 120. For example, the first feature vector 145 indicates feature values (e.g., MFCCs, linear prediction coefficients (LPCs), or other feature values) extracted from (or determined based on) the first utterance 120. Conceptually, the first feature vector 145 represents a point in m-dimensional feature space. The speaker verifier 170 determines a first embedding vector 134 based on the first feature vector 145 by processing the first feature vector 145 using the embedding network 105, as further described with reference to FIG. 4.

The speaker verifier 170, during the verification period, determines a verification distance metric 136 based on a comparison of the first embedding vector 134 and each of the embedding vectors 153 of the speaker template 152. For example, the speaker verifier 170 determines one or more distances 150 between the first embedding vector 134 and each of the embedding vectors 153. The speaker verifier 170 determines a first distance between the first embedding vector 134 and a first particular embedding vector of the embedding vectors 153, a second distance between the first embedding vector 134 and a second particular embedding vector of the embedding vectors 153, one or more additional distances, or a combination thereof.

During a first verification iteration that is subsequent to enrollment of the authorized user and prior to any test embedding vectors being added to the speaker template 152, the embedding vectors 153 include the enrollment embedding vectors 138 and do not include any test embedding vectors. During a subsequent verification iteration that is subsequent to at least one embedding vector being added as a test embedding vector to the embedding vectors 153, the embedding vectors 153 include the enrollment embedding vectors 138 and one or more test embedding vectors 158.

The embedding network 105 is configured to generate embedding vectors such that each embedding vector indicates a first count (e.g., n) of feature values, as further described with reference to FIG. 4. Each of the embedding vectors 153 generated by the embedding network 105 includes n values which together represent an output of an embedding layer of the embedding network 105. Conceptually, an embedding vector represents a point in an n-dimensional embedding space. For example, the first embedding vector 134 represents a first point in n-dimensional embedding space. As another example, each embedding vector of the embedding vectors 153 represents a particular point in the n-dimensional embedding space.

The distances 150 correspond to distances in the n-dimensional embedding space between the first point (represented by the first embedding vector 134) and each point represented by the embedding vectors 153. For example, a first distance of the distances 150 indicates a distance between the first embedding vector 134 and a particular embedding vector of the embedding vectors 153, and a second distance of the distances 150 indicates a distance between the first embedding vector 134 and another embedding vector of the embedding vectors 153. In a particular aspect, each of the distances 150 can be calculated as a Euclidean distance between points in the n-dimensional embedding space. In a particular aspect, each of the distances 150 can be calculated using another distance calculation technique, such as a cosine distance. The speaker verifier 170 determines the verification distance metric 136 based on the distances 150. In a particular example, the verification distance metric 136 corresponds to an average value (e.g., a mean value, a mode value, or a median value) based on the distances 150.

The speaker verifier 170 performs a speaker verification operation to determine, based on the verification distance metric 136, whether the first utterance 120 is verified to be from the authorized user, as further described with reference to FIG. 2. In a particular aspect, the speaker verifier 170, in response to determining that the first utterance 120 is from an unauthorized user (e.g., not verified to be from the authorized user), discards the first embedding vector 134, refrains from adding the first embedding vector 134 to the speaker template 152, generates an alert indicating that an unauthorized user detected, activates a locking mechanism of the device 104, disables access to a particular application of the device 104, or a combination thereof. Alternatively, in a particular aspect, the speaker verifier 170, in response to determining that the first utterance 120 is verified to be from the authorized user, enables access (e.g., continued access) to the device 104, a particular application, a particular service, a particular file, or a combination thereof. In a particular aspect, the speaker verifier 170, based at least in part on determining that the first utterance 120 is verified to be from the authorized user, adds the first embedding vector 134 as a test embedding vector 172 to the speaker template 152. For example, the test embedding vectors 158 include the test embedding vector 172.

In a particular example, the speaker verifier 170, in response to determining that the first utterance 120 is verified to be from the authorized user, adds the first embedding vector 134 as the test embedding vector 172 to the speaker template 152. In another example, the speaker verifier 170, in response to determining that the first utterance 120 is verified to be from the authorized user, determines whether the first embedding vector 134 is to be added to the speaker template 152. To illustrate, the speaker verifier 170 selects a test embedding vector 174 from the test embedding vectors 158 as a candidate embedding vector, as further described with reference to FIG. 2. The speaker verifier 170 generates a test distance metric 144 of the test embedding vector 174. In a particular aspect, the test distance metric 144 is based on distances between the test embedding vector 174 and each of the enrollment embedding vectors 138. For example, the test distance metric 144 corresponds to an average value (e.g., a mean value, a mode value, or a median value) that is based on the distances between the test embedding vector 174 and each of the enrollment embedding vectors 138. The speaker verifier 170 compares the test distance metric 144 to a membership distance metric 156 of the first embedding vector 134. For example, the speaker verifier 170 determines a membership distance metric 156 of the first embedding vector 134, as further described with reference to FIG. 2. To illustrate, the membership distance metric 156 is based on distances between the first embedding vector 134 and each of the enrollment embedding vectors 138. In a particular aspect, the membership distance metric 156 corresponds to an average value (e.g., a mean value, a mode value, or a median value) that is based on the distances between the first embedding vector 134 and each of the enrollment embedding vectors 138.

In a particular implementation, the speaker verifier 170, based on a comparison of the membership distance metric 156 and the test distance metric 144, determines whether the first embedding vector 134 is to be added to the speaker template 152 as a replacement for the test embedding vector 174. For example, the speaker verifier 170, in response to determining that the membership distance metric 156 is greater than or equal to the test distance metric 144, discards the first embedding vector 134, refrains from adding the first embedding vector 134 to the speaker template 152, or both. The speaker verifier 170 thus retains the test embedding vector 174 when the test embedding vector 174 is at least as close as the first embedding vector 134 to (e.g., an average representation) of the enrollment embedding vectors 138. Alternatively, the speaker verifier 170, in response to determining that the membership distance metric 156 is less than the test distance metric 144, generates an updated speaker template 152 by adding the first embedding vector 134 as the test embedding vector 172 to the test embedding vectors 158 and removing the test embedding vector 174 from the test embedding vectors 158. For example, generating the updated speaker template 152 includes modifying the speaker template 152 to replace the test embedding vector 174 with the test embedding vector 172 in the test embedding vectors 158. The speaker verifier 170 thus updates the speaker template 152 to replace the test embedding vector 174 with the test embedding vector 172 when the first embedding vector 134 is closer than the test embedding vector 172 to (e.g., an average representation) of the enrollment embedding vectors 138.

The system 100 thus improves accuracy of speaker verification by adding test embedding vectors to the speaker template that are verified to be from the authorized user. Accuracy of the speaker template is also improved over time by replacing test embedding vectors when utterances corresponding to "better" embedding vectors (e.g., closer to the enrollment embedding vectors) are received.

Figure 2:
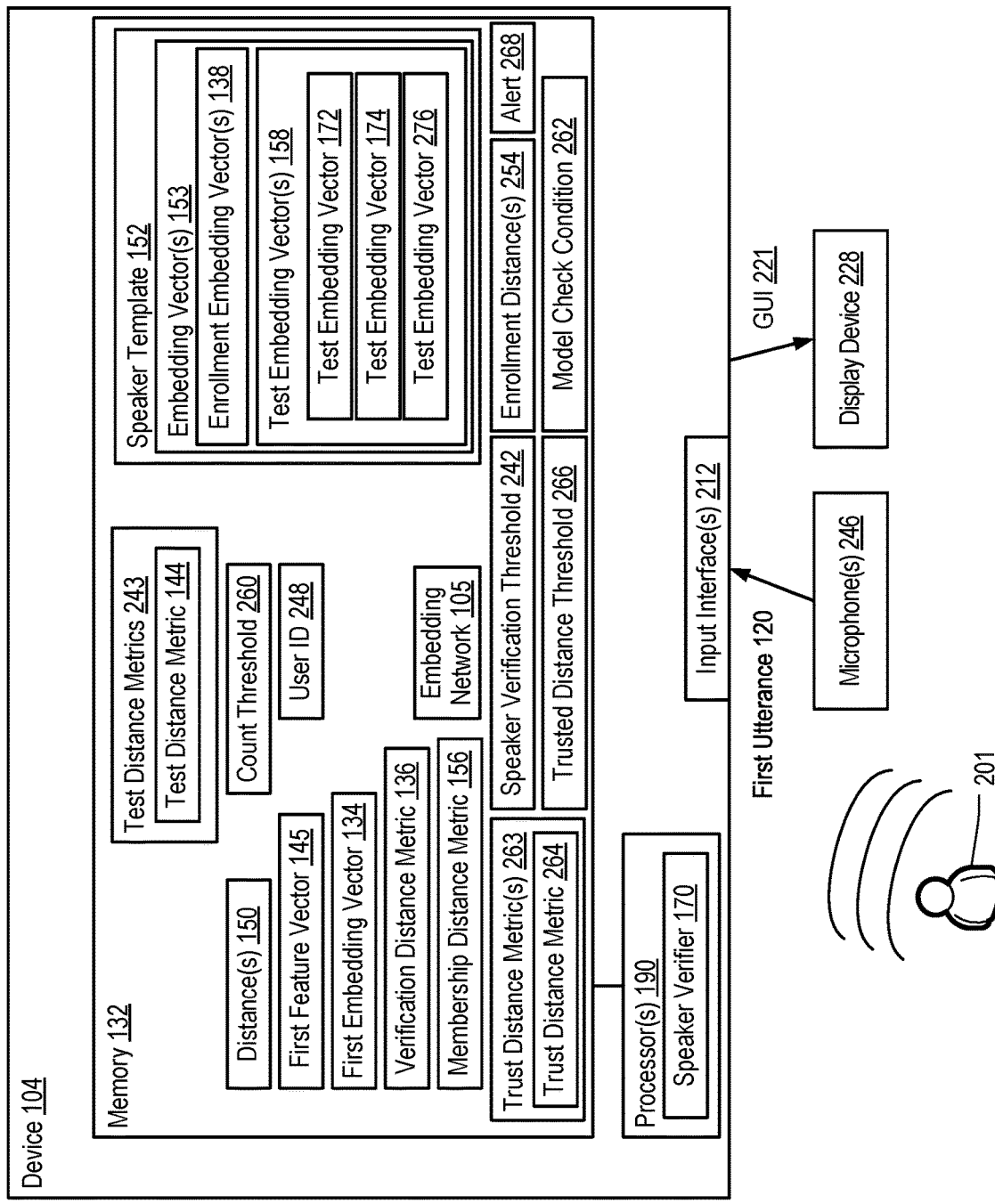
FIG. 2 is a diagram of a particular illustrative example of a system operable to perform speaker verification based on a speaker template.

Referring to FIG. 2, a particular illustrative aspect of a system operable to perform speaker verification is shown and generally designated 200. In a particular aspect, the system 200 includes one or more components of the system 100 of FIG. 1.

The device 104 includes one or more input interfaces 212 coupled to one or more microphones 246. The device 104 is coupled to a display device 228. The memory 132 is configured to store one or more thresholds, such as a speaker verification threshold 242, a count threshold 260, a trusted distance threshold 266, or a combination thereof. In a particular aspect, one or more of the speaker verification threshold 242, the count threshold 260, or the trusted distance threshold 266 correspond to default data, configuration data, user input, or a combination thereof. In a particular aspect, the speaker template 152 is associated with a user identifier (ID) 248 of an authorized user.

During operation, the microphones 246 are configured to provide the first utterance 120 (e.g., an audio signal) to the input interfaces 212. In a particular aspect, the microphones 246 generate the first utterance 120 (e.g., the audio signal) based on detecting sounds corresponding to speech of a user 201. The microphones 246 provide the first utterance 120 to the input interfaces 212.

In a particular implementation, the speaker verifier 170 is configured to, upon activation, identify an authorized user (e.g., a logged-in user) of the device 104. The speaker verifier 170, in response to detecting a verification period (as described with reference to FIG. 1), accesses the speaker template 152 associated with the user ID 248 of the authorized user. The speaker verifier 170 generates the verification distance metric 136 corresponding to the first utterance 120, as described with reference to FIG. 1.

The speaker verifier 170 determines, based on a comparison of the verification distance metric 136 and the speaker verification threshold 242, whether the first utterance 120 is verified to be from the authorized user. For example, the speaker verifier 170, in response to determining that the verification distance metric 136 satisfies (e.g., is less than or equal to) the speaker verification threshold 242, determines that the first utterance 120 is verified to be from the authorized user. Alternatively, the speaker verifier 170, in response to determining that the verification distance metric 136 fails to satisfy (e.g., is greater than) the speaker verification threshold 242, determines that the first utterance 120 is verified to not be from the authorized user (e.g., the first utterance 120 is from an unauthorized user).

In a particular aspect, the speaker verifier 170 maintains a set of the test embedding vectors 158. The number of vectors in the set of the test embedding vectors 158 can be limited based on the count threshold 260 to maintain relatively low memory usage for speaker verification. In a particular aspect, the speaker verifier 170, in response to determining that the first utterance 120 is verified to be from the authorized user and that a count of the test embedding vectors 158 satisfies (e.g., is less than) the count threshold 260, adds the first embedding vector 134 as the test embedding vector 172 to the speaker template 152. Alternatively, the speaker verifier 170, in response to determining that the first utterance 120 is verified to be from the authorized user and that the count of the test embedding vectors 158 fails to satisfy (e.g., is greater than or equal to) the count threshold 260, determines whether the first embedding vector 134 is to be added to the speaker template 152 as a replacement for another test embedding vector of the speaker template 152.

In a particular aspect, the speaker verifier 170, in response to determining that the first utterance 120 is verified to be from the authorized user and that the count of the test embedding vectors 158 fails to satisfy (e.g., is greater than or equal to) the count threshold 260, selects a candidate embedding vector to be replaced from the test embedding vectors 158. For example, the speaker verifier 170 determines the candidate embedding vector based on test distance metrics 243 of the test embedding vectors 158. In a particular implementation, each test distance metric of the test distance metrics 243 is based on distances between a corresponding test embedding vector and each of the enrollment embedding vectors 138. For example, the test distance metrics 243 include the test distance metric 144 of the test embedding vector 174. The speaker verifier 170 selects, based on the test distance metrics 243, one of the test embedding vectors 158 as the candidate embedding vector to be replaced.

In a particular implementation, the speaker verifier 170 selects the worst (e.g., farthest) embedding vector from the test embedding vectors 158 as the candidate embedding vector to be replaced. For example, the speaker verifier 170 selects the test embedding vector 174 as the candidate embedding vector in response to determining that the test distance metric 144 is highest among the test distance metrics 243. In a particular aspect, the test distance metric 144 being the highest indicates that the test embedding vector 174 is furthest among the test embedding vectors 158 from (e.g., an average representation) of the enrollment embedding vectors 138. In a particular aspect, the test distance metrics 243 indicate a level of similarity between the test embedding vectors 158 and the enrollment embedding vectors 138. In this aspect, the candidate embedding vector (e.g., the test embedding vector 174) is least similar (among the test embedding vectors 158) to (e.g., the average representation of) the enrollment embedding vectors 138.

The speaker verifier 170 selects, based at least in part on the membership distance metric 156 of the first embedding vector 134, one of the first embedding vector 134 or the candidate embedding vector (e.g., the test embedding vector 174) to include (e.g., add to or keep in) the speaker template 152. In a particular example, the speaker verifier 170 determines the membership distance metric 156 based on one or more enrollment distances 254 between the first embedding vector 134 and each of the enrollment embedding vectors 138. To illustrate, the enrollment distances 254 include a first distance between the first embedding vector 134 and a first enrollment embedding vector of the enrollment embedding vectors 138, a second distance between the first embedding vector 134 and a second enrollment embedding vector of the enrollment embedding vectors 138, one or more additional distances, or a combination thereof. The membership distance metric 156 corresponds to an average value (e.g., a mean value, a median value, or a mode value) that is based on the enrollment distances 254. The membership distance metric 156 indicates a distance between the first embedding vector 134 and (e.g., an average representation) of the enrollment embedding vectors 138. In a particular aspect, the membership distance metric 156 indicates a level of similarity between the first embedding vector 134 and the enrollment embedding vectors 138.

The speaker verifier 170 selects one of the test embedding vector 174 and the first embedding vector 134 that is closer (e.g., more similar) to the enrollment embedding vectors 138. The speaker verifier 170 includes (e.g., adds or keeps) the selected embedding vector in the speaker template 152. In a particular implementation, the speaker verifier 170, in response to determining that the first embedding vector 134 is better (e.g., closer to the enrollment embedding vectors 138) than the test embedding vector 174, replaces the test embedding vector 174 with the first embedding vector 134 in the speaker template 152. For example, the speaker verifier 170, in response to determining that the test distance metric 144 is greater than the membership distance metric 156, generates an updated version of the speaker template 152 by adding the first embedding vector 134 as the test embedding vector 172 to the speaker template 152, removing the test embedding vector 174 from the speaker template 152, or both. In a particular implementation, the speaker verifier 170 sends a first instruction to the memory 132 to add the first embedding vector 134 as the test embedding vector 172 to the speaker template 152, sends a second instruction to the memory 132 to remove the test embedding vector 174 from the speaker template 152, or both. Alternatively, the speaker verifier 170, in response to determining that the test distance metric 144 is less than or equal to the membership distance metric 156, refrains from updating the speaker template 152, refrains from adding the first embedding vector 134 to the speaker template 152, discards the first embedding vector 134, or a combination thereof.

In a particular implementation, the speaker verifier 170 adds a particular embedding vector as a test embedding vector to the speaker template 152 based on a distance between the particular embedding vector and the embedding vectors 153. Adding the particular embedding vector based on a distance from the embedding vectors 153 (rather than the enrollment embedding vectors 138) enables (e.g., an average representation of) the embedding vectors 153 to move away over time from (e.g., an average representation of) the enrollment embedding vectors 138 in the n-dimensional embedding space.

An embedding vector that may be too far from the embedding vectors 153 (e.g., the enrollment embedding vectors 138) subsequent to an initial enrollment period may be close enough to the embedding vectors 153 subsequent to updating the speaker template 152 (by adding at least one of the test embedding vectors 158 to the speaker template 152). For example, subsequent to an initial enrollment period, the speaker template 152 includes the enrollment embedding vectors 138 and does not include any of the test embedding vectors 158. A first distance between a test embedding vector 276 and an average representation of the embedding vectors 153 (e.g., the enrollment embedding vectors 138) is greater than the verification distance metric 136. During a verification period, the speaker verifier 170 adds at least one of the test embedding vectors 158 to the embedding vectors 153. A second distance between the test embedding vector 276 and an average representation of the embedding vectors 153 (e.g., the enrollment embedding vectors 138 and the at least one of the test embedding vectors 158) is less than the verification distance metric 136. In a particular example, adding the at least one of the test embedding vectors 158 to the speaker template 152 moves the average representation of the embedding vectors 153 such that a distance between the test embedding vector 276 and the average representation of the embedding vectors 153 is reduced. In a particular aspect, the speaker verifier 170 enables incremental (e.g., gradual) changes to the speaker template 152 by selectively adding test embedding vectors based on a comparison with an average representation of the embedding vectors 153, where the average representation of the embedding vectors 153 changes over time as test embedding vectors are added to the speaker template 152.

In a particular implementation, the speaker verifier 170 is configured to limit the embedding vectors 153 from moving too far (in the n-dimensional space) from the enrollment embedding vectors 138. For example, the speaker verifier 170 performs a check of the speaker template 152 in response to determining that a model check condition 262 is satisfied. In a particular aspect, the speaker verifier, subsequent to adding the test embedding vector 172 to the speaker template 152, determines whether the model check condition 262 is satisfied.

In a particular aspect, the speaker verifier 170 determines that the model check condition 262 is satisfied based on determining that a count of the test embedding vectors 158 is greater than or equal to a first threshold. In a particular aspect, the speaker verifier 170 determines that model check condition 262 is satisfied in response to detecting expiration of a model check time period. For example, the speaker verifier 170, in response to determining that at least a threshold time has elapsed since a most recent check of the speaker template 152 was performed, determines that the model check time period has expired.

In a particular implementation, the speaker verifier 170 maintains a count of utterances processed subsequent to the enrollment period. For example, the speaker verifier 170 updates (e.g., increments by 1) the count of processed utterances in response to receiving the first utterance 120, in response to determining the first feature vector 145, in response to generating the first embedding vector 134, in response to adding the first embedding vector 134 as the test embedding vector 172 to the speaker template 152, in response to discarding the first embedding vector 134, or in response to refraining from adding the first embedding vector 134 to the speaker template 152. In a particular implementation, the speaker verifier 170 determines that the model check condition 262 is satisfied in response to determining that the count of processed utterances is greater than a threshold.

The speaker verifier 170, in response to determining that the model check condition 262 is satisfied, performs a check of the speaker template 152. For example, the speaker verifier 170 determines one or more trust distance metrics 263 for the test embedding vectors 158. To illustrate, the speaker verifier 170 determines a trust distance metric 264 of the test embedding vector 276. The trust distance metric 264 is based on distances between the test embedding vector 276 and each of the enrollment embedding vectors 138. For example, the trust distance metric 264 corresponds to an average value (e.g., a mean value, a mode value, or a median value) that is based on the distances between the test embedding vector 276 and each of the enrollment embedding vectors 138.

The speaker verifier 170 compares the trust distance metric 264 to the trusted distance threshold 266. The speaker verifier 170, in response to determining that the trust distance metric 264 fails to satisfy (e.g., is greater than) the trusted distance threshold 266, generates an alert 268 requesting re-enrollment of the authorized user, modifies the speaker template 152 by removing the test embedding vectors 158 from the speaker template 152, provides a GUI 221 indicating the alert 268 to the display device 228, sends the alert 268 to another device, activates a locking mechanism of the device 104, disables access to a particular application of the device 104, or a combination thereof.

Alternatively, the speaker verifier 170, in response to determining that the trust distance metric 264 satisfies (e.g., is less than or equal to) the trusted distance threshold 266, compares a second trust distance metric of the trust distance metrics 263 to the trusted distance threshold 266. The speaker verifier 170, in response to determining that each of the trust distance metrics 263 satisfies the trusted distance threshold 266, stores a status in the memory 132 at a first time indicating that a most recent check of the speaker template 152 was performed at the first time, that the speaker template 152 passed the check, or both.

The system 200 thus enables the speaker template 152 to incrementally move away from the enrollment embedding vectors 138, while limiting the speaker template 152 from moving too far away from the enrollment embedding vectors 138. For example, re-enrollment of the authorized user is requested in response to determining that the test embedding vector 276 is too far from the enrollment embedding vectors 138.

Figure 3:
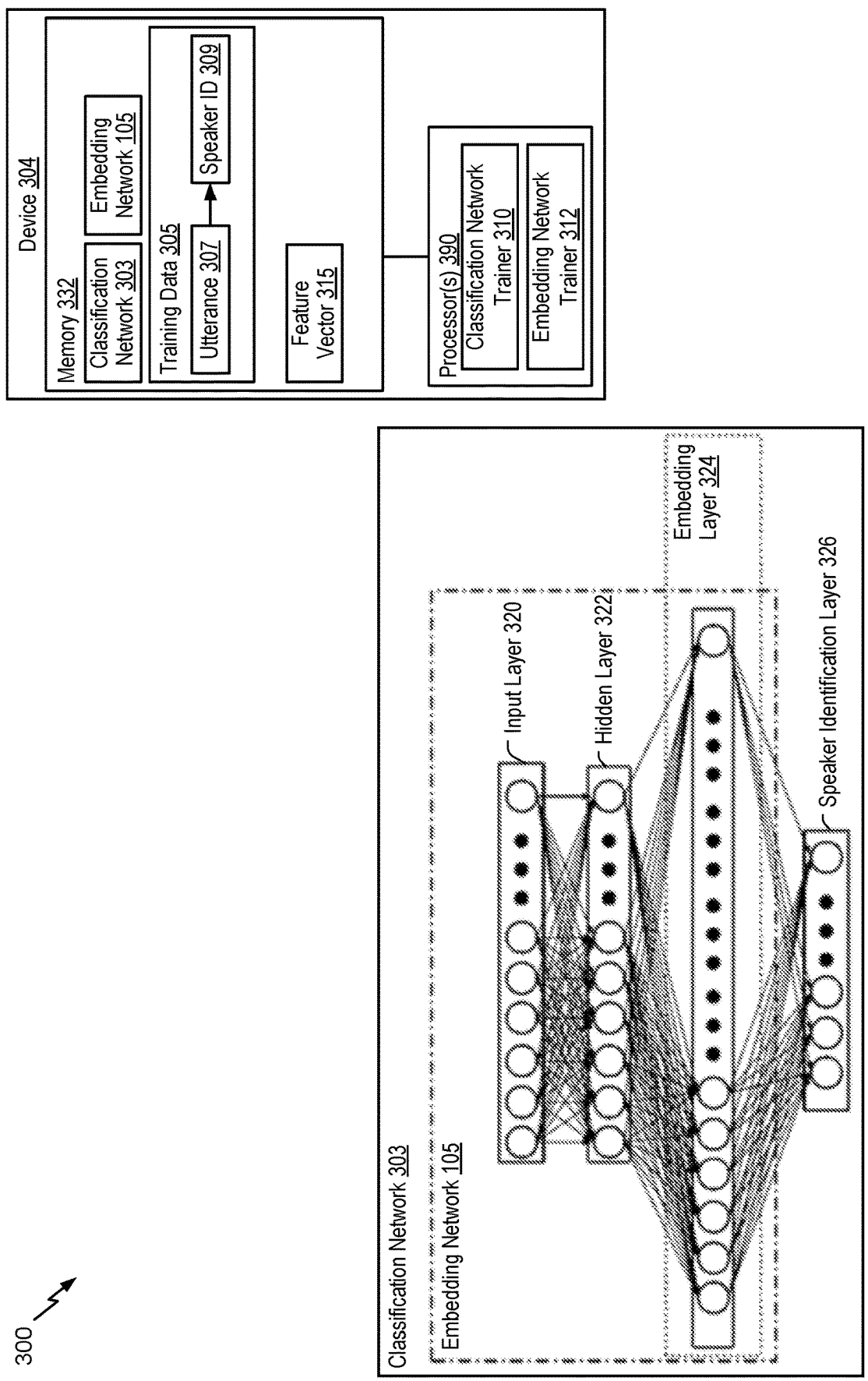
FIG. 3 is a diagram of a particular illustrative example of a system operable to generate an embedding network.

Referring to FIG. 3, a particular illustrative aspect of a system operable to generate an embedding network is shown and generally designated 300. The system 300 includes a device 304. In a particular aspect, the device 304 includes one or more components of the device 104 of FIGS. 1-2. For example, the device 304 is the same as the device 104. In a particular aspect, the device 304 differs from the device 104. For example, the device 304 generates the embedding network 105 and provides the embedding network 105 to the device 104.

The device 304 includes a memory 332. The memory 332 is coupled to one or more processors 390. The processors 390 include a classification network trainer 310, an embedding network trainer 312, or both. The memory 332 is configured to store training data 305. For example, the training data 305 corresponds to a database including utterances (e.g., audio files) associated with a plurality of speakers (e.g., users). In a particular aspect, the training data 305 is a publicly available (e.g., commercially available) database of audio samples from diverse group of speakers (e.g., corresponding to various ages, accents, genders, languages, or a combination thereof). To illustrate, the training data 305 includes utterance 307 associated with a speaker identifier (ID) 309 of a first speaker.

The classification network trainer 310 is configured to generate a classification network 303 (e.g., a classification neural network). The classification network 303 includes an input layer 320, one or more hidden layers, and an output layer (e.g., a speaker identification layer 326). For example, the one or more hidden layers include a hidden layer 322, an embedding layer 324, one or more additional hidden layers, or a combination thereof.

The classification network trainer 310 uses various classification network training techniques to train the classification network 303 based on the training data 305. For example, the classification network trainer 310 generates a feature vector 315 from the utterance 307. The classification network trainer 310 uses the classification network 303 to process the feature vector 315. The classification network 303 is trained such that the output values of the speaker identification layer 326 indicate the speaker identifier 309.

The classification network trainer 310, subsequent to training the classification network 303 based on the training data 305, provides the classification network 303 to the embedding network trainer 312. The embedding network trainer 312 generates the embedding network 105 by removing the speaker identification layer 326 (e.g., an output layer) from the classification network 303. For example, the embedding network 105 includes the input layer 320 and the one or more hidden layers (e.g., the hidden layer 322 and the embedding layer 324) of the classification network 303. The embedding network 105 excludes the speaker identification layer 326 of the classification network 303. In a particular aspect, the embedding network trainer 312 trains the embedding network 105, as described with reference to FIGS. 4-6, prior to using the embedding network 105 for speaker enrollment, as described with reference to FIG. 7.

Figure 4:
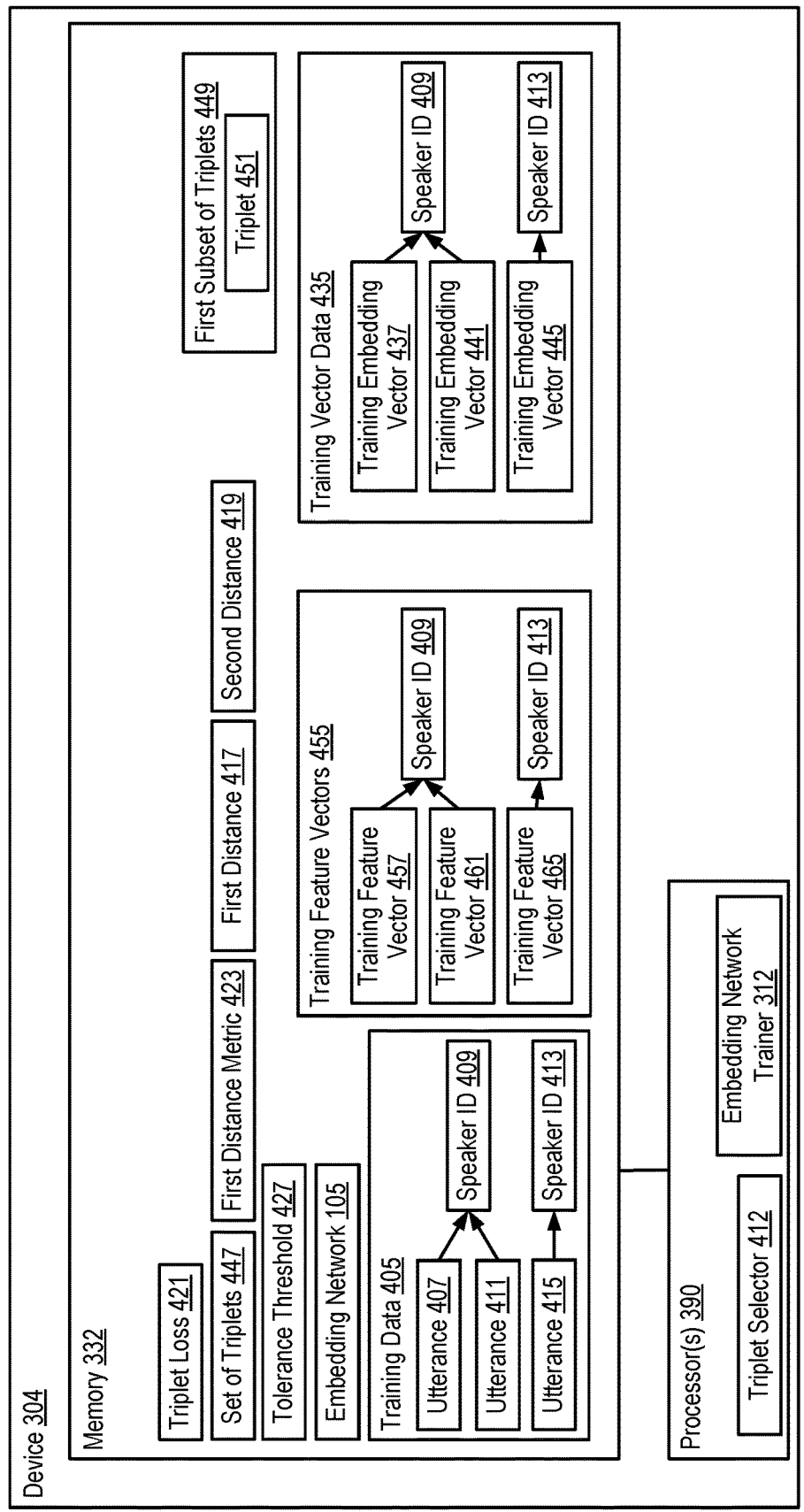
FIG. 4 is a diagram of a particular illustrative example of a system operable to train an embedding network.

Referring to FIG. 4, a particular illustrative aspect of a system operable to train an embedding network is shown and generally designated 400. In a particular aspect, the system 400 includes one or more components of the system 200 of FIG. 2, one or more components of the system 300 of FIG. 3, or a combination thereof.

The embedding network trainer 312 generates the embedding network 105 by removing the speaker identification layer 326 from the classification network 303, as described with reference to FIG. 3. In a particular aspect, the embedding network trainer 312 performs additional training of the embedding network 105 to improve accuracy of the embedding network 105, as described herein.

The memory 332 includes training data 405. In a particular aspect, the training data 405 includes at least a portion of the training data 305. In an alternative aspect, the training data 405 is distinct from the training data 305. The training data 405 includes utterances (e.g., audio files) associated with various speakers. For example, the training data 405 includes an utterance 407 and an utterance 411 associated with a speaker ID 409 of a first speaker, and includes an utterance 415 associated with a speaker ID 413 of a second speaker. The processors 390 include a triplet selector 412, the embedding network trainer 312, or both.

The embedding network trainer 312 generates training feature vectors 455 based on the training data 405. For example, the embedding network trainer 312 extracts (or determines) a training feature vector 457, a training feature vector 461, and a training feature vector 465 from the utterance 407, the utterance 411, and the utterance 415, respectively. Each of the training feature vector 457 and the training feature vector 461 is associated with the speaker ID 409. The training feature vector 465 is associated with the speaker ID 413.

The embedding network trainer 312 generates training vector data 435 based on the training data 405. The embedding network trainer 312 generates a training embedding vector 437, a training embedding vector 441, and a training embedding vector 445 by using the embedding network 105 to process the training feature vector 457, the training feature vector 461, and the training feature vector 465, respectively. For example, the embedding network trainer 312 provides feature values of the training feature vector 457 as input values to the nodes of the input layer 320 of FIG. 3. The embedding network 105 processes the input values of the input layer 320 to generate output values of the nodes of the embedding layer 324 of FIG. 3. The embedding network trainer 312 generates the training embedding vector 437 to indicate the output values of the embedding layer 324.

The training vector data 435 indicates training embedding vectors associated with various speakers. For example, the training vector data 435 indicates that each of the training embedding vector 437 and the training embedding vector 441 is associated with the speaker ID 409. The training vector data 435 indicates that the training embedding vector 445 is associated with the speaker ID 413.

The triplet selector 412 selects (or generates) a first subset of triplets 449 based on the training vector data 435, as further described with reference to FIG. 5. In a particular aspect, the triplet selector 412 generates the first subset of triplets 449 (e.g., without first generating a larger set of triplets and selecting the first subset of triplets 449 from the larger set of triplets). For example, the triplet selector 412 generates a triplet 451 by selecting two embedding vectors associated with the same speaker ID and one embedding vector associated with another speaker ID. To illustrate, the triplet selector 412 selects the training embedding vector 437 and the training embedding vector 441 associated with the speaker ID 409. The triplet selector 412 selects the training embedding vector 445 associated with the speaker ID 413. The triplet selector 412 adds the triplet 451 to the first subset of triplets 449.

In a particular aspect, the triplet selector 412 randomly selects the training embedding vector 445. In an alternate aspect, the triplet selector 412 selects the training embedding vector 445 based on distance metrics. For example, the triplet selector 412 determines a first distance 417 between the training embedding vector 437 and the training embedding vector 441. The triplet selector 412 determines a second distance 419 between the training embedding vector 437 and the training embedding vector 445. The triplet selector 412 generates a first distance metric 423 based on the first distance 417 and the second distance 419. For example, the first distance metric 423 indicates a difference between the first distance 417 and the second distance 419. In a particular aspect, a positive value of the first distance metric 423 indicates a greater distance from the training embedding vector 437 to the training embedding vector 441 (associated with the same speaker ID) than to the training embedding vector 445 (associated with a different speaker ID).

The triplet selector 412 selects the training embedding vector 445 based on determining that the first distance metric 423 satisfies (e.g., is greater than) a tolerance threshold 427 (e.g., zero or a tolerance value). In a particular aspect, the tolerance threshold 427 is based on a default value, a configuration setting, a user input, or a combination thereof. The triplet selector 412 generates the triplet 451 including the selected embedding vectors. For example, the triplet selector 412 generates the triplet 451 including the training embedding vector 437, the training embedding vector 441, and the training embedding vector 445.

In a particular aspect, the triplet selector 412 generates a set of triplets 447 and selects the first subset of triplets 449 from the set of triplets 447 based on distance metrics. For example, the triplet selector 412 generates the set of triplets 447 such that a particular triplet of the set of triplets 447 includes two training embedding vectors associated with the same speaker ID and one training embedding vector associated with another speaker ID. To illustrate, the set of triplets 447 includes the triplet 451, one or more additional triplets, or a combination thereof. The triplet selector 412 determines distance metrics of the set of triplets 447. For example, the triplet selector 412 determines the first distance metric 423 of the triplet 451. The triplet selector 412 selects, based on the distance metrics, the first subset of triplets 449 from the set of triplets 447. For example, the triplet selector 412 selects the triplet 451 in the first subset of triplets 449 based on determining that the first distance metric 423 satisfies the tolerance threshold 427.

The embedding network trainer 312 generates a trained version of the embedding network 105 (e.g., a trained embedding network) by training the embedding network 105 using the first subset of triplets 449. In a particular aspect, the embedding network trainer 312 trains the embedding network 105 using the first subset of triplets 449 prior to training the embedding network 105 based on one or more second subsets (e.g., remaining subsets) of the set of triplets 447. In a particular aspect, the embedding network trainer 312, subsequent to training the embedding network 105 based on the one or more second subsets of the set of triplets 447, trains the embedding network 105 using the set of triplets 447.

The embedding network trainer 312 determines a triplet loss 421 corresponding to the triplet 451. For example, the triplet loss 421 is based on the first distance 417 and the second distance 419 (e.g., the triplet loss 421=max(the first distance 417–the second distance 419+margin, 0)). As another example, the triplet loss 421 is based on the first distance metric 423 (e.g., the triplet loss 421=max (the first distance metric 423+margin, 0)). In a particular aspect, margin corresponds to a threshold value (e.g., the tolerance threshold 427). The embedding network trainer 312 trains the embedding network 105 based on the triplet loss 421. For example, the embedding network trainer 312 updates weights of one or more hidden layers (e.g., the hidden layer 322), the embedding layer 324, or a combination thereof, based on the triplet loss 421.

In a particular aspect, the triplet loss 421 corresponds to cross-entropy loss. The embedding network trainer 312 updates the weights of the embedding network 105 to reduce a triplet loss (as compared to the triplet loss 421) of the training feature vector 457, the training feature vector 461, and the training feature vector 465 are processed using the embedding network 105 with the updated weights. For example, a triplet loss of zero indicates that a first distance between training embedding vectors associated with the same speaker ID is less than a second distance between training embedding vectors associated with distinct speaker IDs. In a particular aspect, the embedding network trainer 312 provides the embedding network 105 to the speaker verifier 170 of FIG. 1.

The system 400 thus enables training of the embedding network 105 to generate embedding vectors associated with feature vectors of utterances from the same speaker that are closer to each other as compared to embedding vectors associated with feature vectors of utterances from different speakers. For example, the embedding network 105 is trained such that if the embedding network 105 generates a first embedding vector corresponding to a first utterance that is within a verification distance (e.g., corresponding to the speaker verification threshold 242 of FIG. 2) of a second embedding vector corresponding to a second utterance, then there is a high likelihood of the first utterance and the second utterance being from a common speaker. The speaker verifier 170 can use the embedding network 105 to verify whether a first utterance and a second utterance are from the speaker by generating corresponding embedding vectors and determining whether the embedding vectors are within the verification distance (e.g., in n-dimensional space) from each other.

Figure 5:
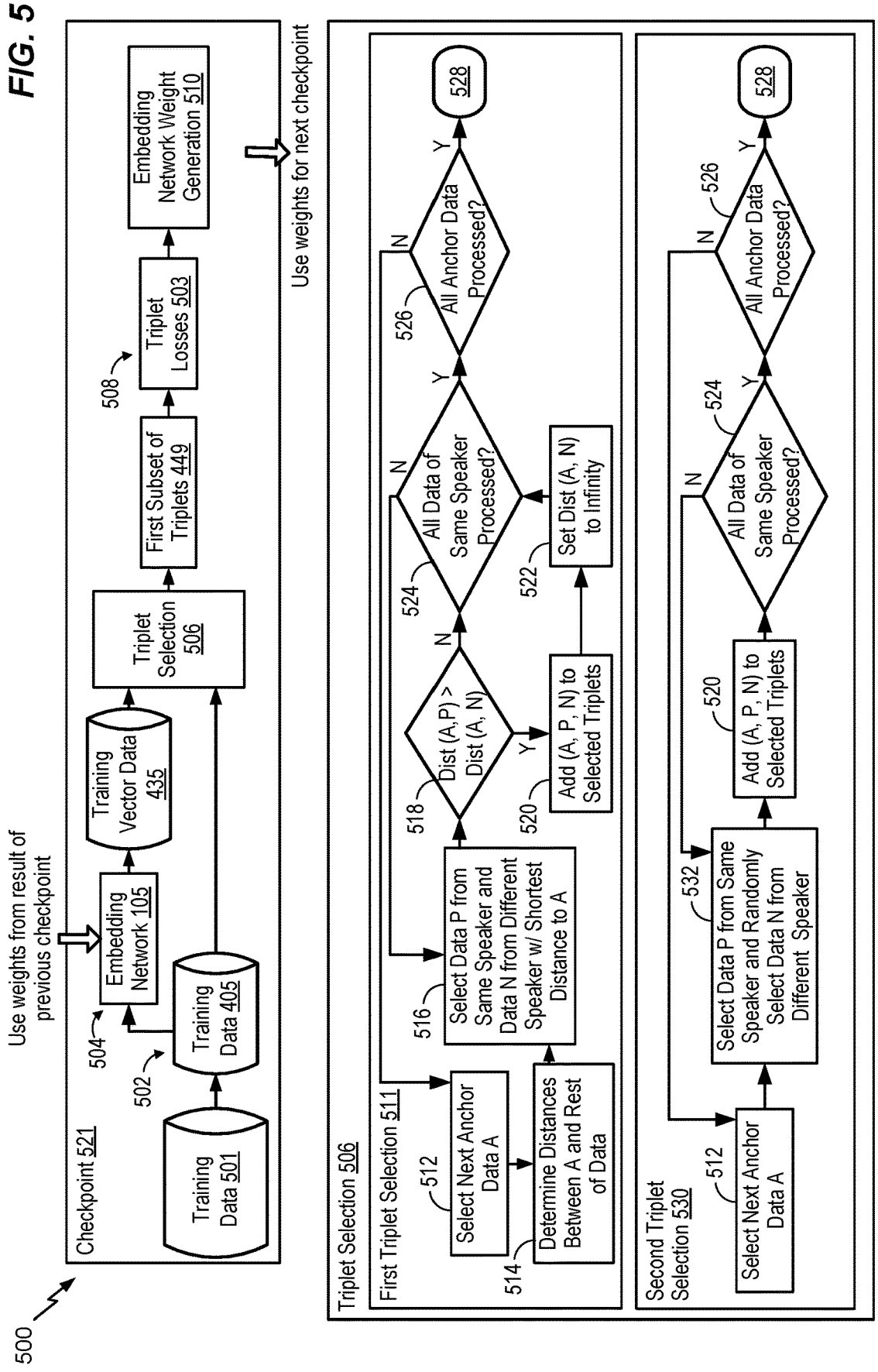
FIG. 5 is a diagram of a particular illustrative example of a method of training an embedding network.

Referring to FIG. 5, a particular illustrative aspect of a method of training an embedding network is shown and generally designated 500. In a particular aspect, one or more operations of the method 500 are performed by the device 104, the system 100 of FIG. 1, the system 200 of FIG. 2, the embedding network trainer 312, the device 304, the system 300 of FIG. 3, the triplet selector 412, the system 400 of FIG. 4, or a combination thereof.

The embedding network trainer 312 of FIG. 3 generates the embedding network 105 by removing the speaker identification layer 326 from the classification network 303, as described with reference to FIG. 3. In a particular aspect, the embedding network trainer 312 performs additional training of the embedding network 105 to improve accuracy of the embedding network 105, as described with reference to FIG. 4. For example, the embedding network trainer 312, the triplet selector 412, or both, perform one or more of operations of the method 500. In a particular aspect, the method 500 includes performing iterative training of the embedding network 105, and an iteration of training the embedding network 105 corresponds to a checkpoint 521.

The method 500 includes selecting a subset of data from training data, at 502. For example, the embedding network trainer 312 of FIG. 3 divides up training data 501 into a particular number of subsets (e.g., 3 subsets). The embedding network trainer 312 selects a next subset of the particular number of subsets during each checkpoint. For example, the embedding network trainer 312 selects the training data 405 in response to determining that the training data 405 is the next subset of the training data 501 to be processed.

The method 500 also includes using an embedding network to generate training vector data corresponding to the subset data, at 504. For example, the embedding network trainer 312 uses the embedding network 105 to generate the training vector data 435 corresponding to the training data 405, as described with reference to FIG. 4. In a particular aspect, the embedding network trainer 312, prior to generating the training vector data 435, updates weights of the embedding network 105 based on weight values determined during a previous checkpoint. To illustrate, during each iteration of training the embedding network 105, the embedding network 105 is used to generate training vector data, the training vector data is used to determine weight values, and the weight values are used to update (e.g., train) the embedding network 105 at the beginning of the next training iteration. Accuracy of the training vector data generated by the embedding network 105 is improved (e.g., in terms of reduced triplet losses) over multiple iterations.

The method 500 further includes generating a first subset of triples by performing triplet selection based on the training vector data, at 506. For example, the triplet selector 412 of FIG. 4 performs triplet selection, based on the training vector data 435, to generate the first subset of triplets 449, as described herein.

The method 500 also includes determining triplet losses for the first subset of triplets, at 508. For example, the embedding network trainer 312 determines triplet losses for the first subset of triplets 449. To illustrate, the embedding network trainer 312 determines the triplet loss 421 of the triplet 451, one or more additional triplet losses for one or more additional triplets of the first subset of triplets 449, or a combination thereof.

The method 500 further includes embedding network weight generation, at 510. For example, the embedding network trainer 312 determines that nodes of the embedding network 105 have first weight values. The embedding network trainer 312 uses classification neural network training techniques to determine second weight values by adjusting the first weight values based on the triplet losses 503. For example, the embedding network trainer 312 determines first particular weight values by adjusting the first weight values based on the triplet loss 421, determines second particular weight values by adjusting the first particular weight values based on a second triplet loss of the triplet losses 503, and so on. In a particular aspect, the embedding network trainer 312 determines the second weight values after processing all of the triplet losses 503. The embedding network trainer 312 uses the second weight values to update the weights of the embedding network 105 during a subsequent checkpoint.

In a particular aspect, the triplet selection 506 includes a first triplet selection 511. The first triplet selection 511 includes selecting next anchor data A, at 512. For example, the triplet selector 412 of FIG. 4 selects a next training embedding vector from the training vector data 435. To illustrate, the training vector data 435 is sorted by speaker ID. The triplet selector 412 selects the training embedding vector 437 in response to determining that the training embedding vector 437 is a next embedding vector to be processed from the training vector data 435.

The first triplet selection 511 also includes determining distances between A and the rest of the data, at 514. For example, the triplet selector 412 of FIG. 4 determines distances between the training embedding vector 437 and each of the remaining embedding vectors of the training vector data 435. To illustrate, the triplet selector 412 determines the first distance 417 between the training embedding vector 437 and the training embedding vector 441. The triplet selector 412 determines the second distance 419 between the training embedding vector 437 and the training embedding vector 445.

The first triplet selection 511 further includes selecting data P from same speaker and data N from different speaker with shortest distance to A, at 516. For example, the triplet selector 412 from FIG. 4 selects the training embedding vector 441 in response to determining that the training embedding vector 441 is associated with the same speaker ID (e.g., the speaker ID 409) as associated with the training embedding vector 437. In a particular aspect, the triplet selector 412 identifies a first set of the training embedding vectors of the training vector data 435 such that each training embedding vector of the first set is associated with a speaker ID other than the speaker ID 409. The triplet selector 412 sorts the first set of training embedding vectors based on distance from the training embedding vector 437. The triplet selector 412 selects the training embedding vector 445 in response to determining that the training embedding vector 445 is the shortest distance (among the first set of training embedding vectors) from the training embedding vector 437.

The first triplet selection 511 also includes determining whether a first distance between A and P is greater than a second distance between A and N, at 518. For example, the triplet selector 412 of FIG. 4 determines whether the first distance 417 (between the training embedding vector 437 and the training embedding vector 441) is greater than the second distance 419 (between the training embedding vector 437 and the training embedding vector 445).

The first triplet selection 511 further includes, in response to determining that the first distance is less than or equal to the second distance, determining whether all data of same speaker has been processed, at 524. For example, the triplet selector 412 of FIG. 4, in response to determining that the first distance 417 is less than or equal to the second distance 419, refrains from adding a triplet including the training embedding vector 437, the training embedding vector 441, and the training embedding vector 445 to the first subset of triplets 449. The triplet selector 412 determines whether a next training embedding vector of the training vector data 435 is associated with the same speaker ID (e.g., the speaker ID 409) that is associated with the training embedding vector 437.

The first triplet selection 511 further includes, in response to determining that the first distance is greater than the second distance, at 518, adding a triplet (A, P, N) to selected triplets, at 520. For example, the triplet selector 412 of FIG. 4, in response to determining that the first distance 417 is greater than the second distance 419, adds the triplet 451 (e.g., including the training embedding vector 437, the training embedding vector 441, and the training embedding vector 445) to the first subset of triplets 449.

The first triplet selection 511 also includes setting the second distance between A and N to infinity, at 522. The first triplet selection 511 continues to 524. For example, the triplet selector 412 of FIG. 4 updates the distances to set the second distance 419 to a particular value (e.g., a maximum value or infinity) to reduce a likelihood of the training embedding vector 437 and the training embedding vector 445 being selected in another triplet.

The first triplet selection 511 includes, in response to determining that all data of same speaker has not been processed, at 524, continuing to 516. For example, the triplet selector 412 of FIG. 4, in response to determining that a next training embedding vector (e.g., the training embedding vector 441) of the training vector data 435 is associated with the speaker ID 409, selects a third training embedding vector associated with the speaker ID 409 and a fourth training embedding vector that is not associated with the speaker ID 409 and is the shortest distance from the third training embedding vector (among training embedding vectors that are not associated with the speaker ID 409).

The first triplet selection 511 also includes, in response to determining that all data of same speaker has been processed, at 524, determining whether all anchor data has been processed, at 526. For example, the triplet selector 412 of FIG. 4, in response to determining that a next training embedding vector of the training vector data 435 is not associated with the speaker ID 409, determines whether the training vector data 435 includes a next training embedding vector. To illustrate, the triplet selector 412 of FIG. 4 determines whether all of the training embedding vectors of the training vector data 435 have been processed.

The first triplet selection 511 includes, in response to determining that all anchor data has not been processed, at 526, continuing to 512. For example, the triplet selector 412 of FIG. 4, in response to determining that all of the training embedding vectors of the training vector data 435 have not been processed, selects a next training embedding vector (e.g., the training embedding vector 445) of the training vector data 435. The next training embedding vector is associated with a speaker ID other than the speaker ID 409.

For example, the next training embedding vector includes the training embedding vector 445 associated with the speaker ID 413.

The first triplet selection 511, in response to determining that all anchor data has been processed, at 526, ends at 528. For example, the triplet selector 412 of FIG. 4, in response to determining that all of the training vector data 435 has been processed, determines that triplet selection has been completed.

In a particular aspect, the triplet selection 506 includes a second triplet selection 530. The second triplet selection 530 differs from the first triplet selection 511 in that each triplet includes a randomly selected embedding vector from another speaker instead of an embedding vector from another speaker that is selected based on distance.

The second triplet selection 530 continues from 512 to 532. The second triplet selection 530 includes selecting data P from same speaker and randomly selecting data N from different speaker, at 532. For example, the triplet selector 412 selects the training embedding vector 441 in response to determining that the training embedding vector 441 is associated with the same speaker ID (e.g., the speaker ID 409) that is associated with the training embedding vector 437. The triplet selector 412 selects the training embedding vector 445 in response to determining that the training embedding vector 441 is associated with the speaker ID 413 that is distinct from the speaker ID 409 associated with the training embedding vector 437. The training embedding vector 445 is selected independently of the second distance 419.

The second triplet selection 530 continues to 520. For example, the triplet selector 412 adds the triplet 451 (including the training embedding vector 437, the training embedding vector 441, and the training embedding vector 445) to the first subset of triplets 449.

The second triplet selection 530 continues to 524. For example, the triplet selector 412 of FIG. 4 determines whether a next training embedding vector to be processed of the training vector data 435 is associated with the speaker ID 409.

The second triplet selection 530, in response to determining that all data of the same speaker has not been processed, at 524, continues to 532. For example, the triplet selector 412 of FIG. 4, in response to determining that a next training embedding vector to be processed is associated with the speaker ID 409, selects a second training embedding vector of the training vector data 435 associated with the same speaker ID (e.g., the speaker ID 409) as the training embedding vector 437. The triplet selector 412 selects a third training embedding vector of the training vector data 435 associated with a second speaker ID that is distinct from the speaker ID 409 associated with the training embedding vector 437.

The second triplet selection 530, in response to determining that all data of the same speaker has been processed, at 524, continues to 526. For example, the triplet selector 412 of FIG. 4, in response to determining that a next training embedding vector of the training vector data 435 is not associated with the speaker ID 409, determines whether the training vector data 435 includes a next training embedding vector. To illustrate, the triplet selector 412 of FIG. 4 determines whether all of the training embedding vectors of the training vector data 435 have been processed.

The second triplet selection 530, in response to determining that all anchor data has not been processed, at 526, continues to 512. For example, the triplet selector 412 of FIG. 4, in response to determining that all of the training embedding vectors of the training vector data 435 have not been processed, selects a next training embedding vector (e.g., the training embedding vector 445) of the training vector data 435. The next training embedding vector is associated with a speaker ID other than the speaker ID 409. For example, the next training embedding vector includes the training embedding vector 445 associated with the speaker ID 413.

The second triplet selection 530, in response to determining that all anchor data has been processed, at 526, ends at 528. For example, the triplet selector 412 of FIG. 4, in response to determining that all of the training vector data 435 has been processed, determines that triplet selection has been completed.

In a particular aspect, the triplet selector 412 performs the same triplet selection (e.g., the first triplet selection 511 or the second triplet selection 530) during each checkpoint. In an alternate aspect, the triplet selector 412 performs the first triplet selection 511 during a first checkpoint and performs the second triplet selection 530 during a second checkpoint.

The method 500 thus enables training of the embedding network 105 to generate embedding vectors of the same speaker to have shorter distances than embedding vectors of different speakers. In a particular aspect, using the first triplet selection 511 leads to a greater improvement in accuracy of the embedding network 105 as compared to using the second triplet selection 530. In a particular aspect, the embedding network 105 is considered to be more accurate if the embedding network 105 generates embedding vectors such that embedding vectors of the same speaker are closer to each other than to embedding vectors of a different speaker. In a particular aspect, using a combination of the first triplet selection 511 (e.g., in a first checkpoint) and the second triplet selection 530 (e.g., in a second checkpoint) improves accuracy of the embedding network 105 as compared to using the second triplet selection 530 (e.g., in each checkpoint).

Figure 6:
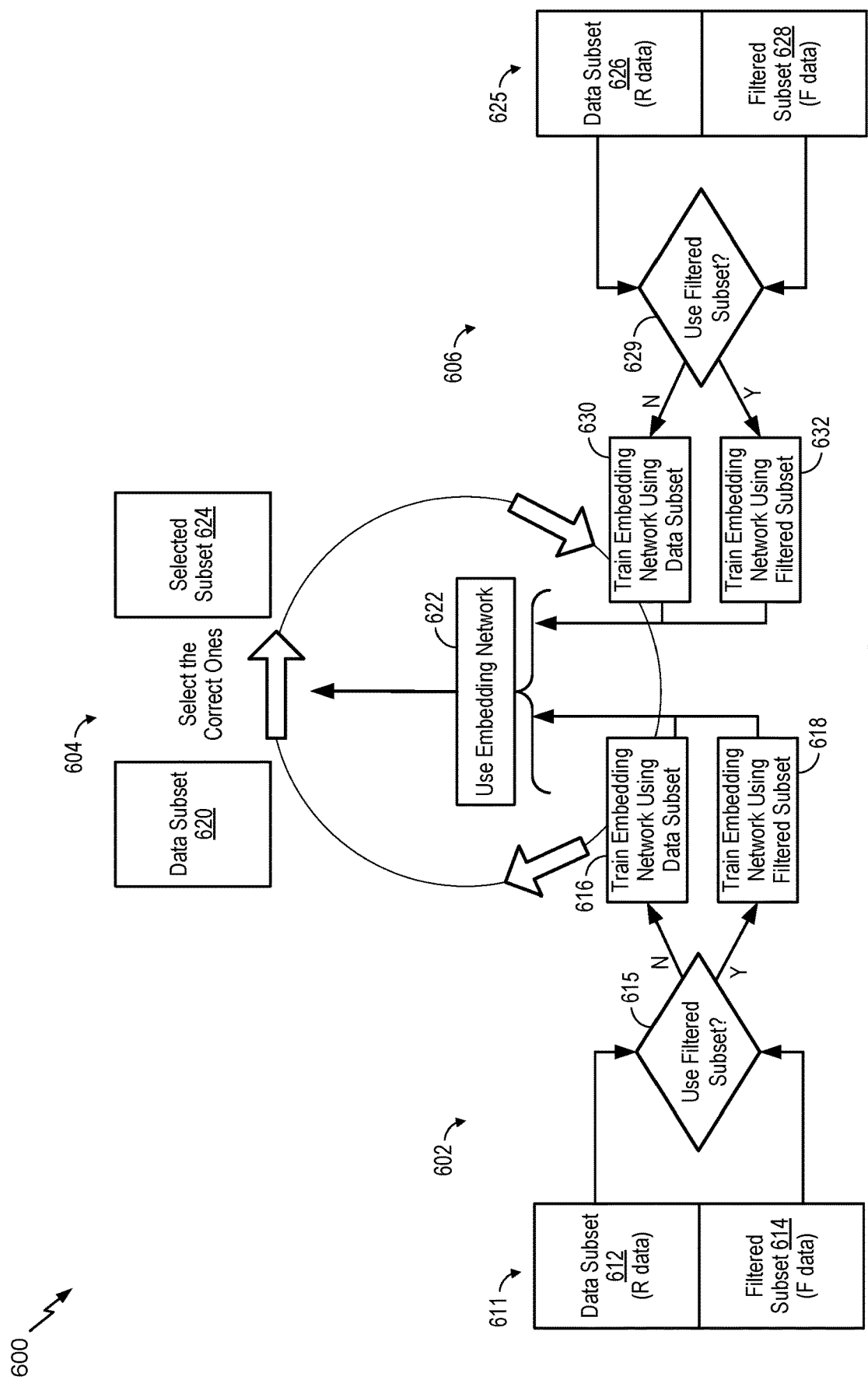
FIG. 6 is a diagram of a particular illustrative example of a method of training an embedding network.

Referring to FIG. 6, a particular illustrative aspect of a method of training an embedding network is shown and generally designated 600. In a particular aspect, one or more operations of the method 600 are performed by the device 104, the system 100 of FIG. 1, the system 200 of FIG. 2, the embedding network trainer 312, the device 304, the system 300 of FIG. 3, the triplet selector 412, the system 400 of FIG. 4, or a combination thereof.

The embedding network trainer 312 of FIG. 3 generates the embedding network 105 by removing the speaker identification layer 326 from the classification network 303, as described with reference to FIG. 3. In a particular aspect, the embedding network trainer 312 performs additional training of the embedding network 105 to improve accuracy of the embedding network 105, as described with reference to FIG. 4. For example, the embedding network trainer 312, the triplet selector 412, or both, perform one or more of operations of the method 500, one or more operations of the method 600, or a combination thereof.

The method 600 includes iteratively training the embedding network 105. For example, a particular iteration corresponds to a checkpoint 602, a checkpoint 604, and a checkpoint 606. In a particular aspect, a first set of iterations corresponds to processing first training data at the checkpoint 602, the checkpoint 604, and the checkpoint 606 based on first training data. In a particular aspect, a second set of iterations corresponds to using second training data at the checkpoint 602, the checkpoint 604, and the checkpoint 606.

The method 600 includes generating multiple subsets of a set of training data. For example, the method 600 includes generating a first training data subset, a second training data subset, a third training data subset, one or more additional training data subsets, or a combination thereof, from the training data 501 of FIG. 5.

The checkpoint 602 includes using the embedding network 105 of FIG. 1 to generate a data subset 612 and a filtered subset 614 corresponding to the first training data subset, at 611. In a particular example, the embedding network trainer 312 of FIG. 3 generates first training vector data (e.g., the training vector data 435 of FIG. 2) by using the embedding network 105 to process the first training data subset (e.g., the training data 405), as described with reference to FIG. 5. The embedding network trainer 312 generates the data subset 612 (e.g., the first subset of triplets 449) by performing the second triplet selection 530 based on the first training vector data (e.g., the training vector data 435), as described with reference to FIG. 5. The embedding network trainer 312 generates the filtered subset 614 (e.g., the first subset of triplets 449) by performing the first triplet selection 511 based on the first training vector data (e.g., the training vector data 435), as described with reference to FIG. 5.

The checkpoint 602 also includes determining whether the filtered subset is to be used to train the embedding network, at 615. For example, the embedding network trainer 312 determines, based on a configuration setting, a default value, a user input, or a combination thereof, whether the filtered subset is to be used. In a particular aspect, the embedding network trainer 312, in response to determining that the filtered subset was not used during a previous iteration, determines that the filtered subset is to be used. In a particular aspect, the embedding network trainer 312 determines that the filtered subset is to be used during alternate iterations. For example, the embedding network trainer 312 maintains an iteration count and updates (e.g., increments by 1) the iteration count during the checkpoint 602. The embedding network trainer 312, in response to determining that the iteration count indicates an odd-numbered iteration, determines that the filtered subset is not to be used. Alternatively, the embedding network trainer 312, in response to determining that the iteration count indicates an even-numbered iteration, determines that the filtered subset is to be used.

The checkpoint 602 includes, in response to determining that the filtered subset is not to be used, at 615, training the embedding network using the data subset, at 616. For example, the embedding network trainer 312, in response to determining that the filtered subset is not to be used, determines first triplet losses (e.g., the triplet losses 503) based on the data subset 612 (e.g., the first subset of triplets 449), as described with reference to FIG. 5. The embedding network trainer 312 generates first weight values based on the first triplet losses (e.g., the triplet losses 503), as described with reference to the embedding network weight generation 510 of FIG. 5. The embedding network trainer 312 trains the embedding network 105 by updating, based on the first weight values, weights of nodes of the embedding network 105, as described with reference to FIG. 5.

The checkpoint 602, includes, in response to determining that the filtered subset is to be used, at 615, training the embedding network using the filtered subset, at 618. For example, the embedding network trainer 312, in response to determining that the filtered subset is to be used, determines second triplet losses (e.g., the triplet losses 503) based on the filtered subset 614 (e.g., the first subset of triplets 449), as described with reference to FIG. 5. The embedding network trainer 312 generates second weight values based on the second triplet losses (e.g., the triplet losses 503), as described with reference to the embedding network weight generation 510 of FIG. 5. The embedding network trainer 312 trains the embedding network 105 by updating, based on the second weight values, weights of nodes of the embedding network 105, as described with reference to FIG. 5.

The checkpoint 604 includes using the embedding network 105 of FIG. 1 to generate a data subset 620 corresponding to the second training data subset, at 622. In a particular example, the embedding network trainer 312 of FIG. 3 generates second training vector data (e.g., the training vector data 435 of FIG. 2) by using the embedding network 105 to process the second training data subset (e.g., the training data 405), as described with reference to FIG. 5. The embedding network trainer 312 generates the data subset 620 (e.g., the first subset of triplets 449) by performing the second triplet selection 530 based on the second training vector data (e.g., the training vector data 435), as described with reference to FIG. 5.

The checkpoint 604 includes generated a selected subset based on the data subset, at 604. For example, the embedding network trainer 312 of FIG. 3 identifies a selected subset 624 of the data subset 620. A particular triplet of the data subset 620 is included in the selected subset 624 if a first distance between embedding vectors of the particular triplet corresponding to the same speaker is less than a second distance between embedding vectors of the particular triplet corresponding to different speakers. For example, the data subset 620 includes the triplet 451 of FIG. 4. The embedding network trainer 312 adds the triplet 451 to the selected subset 624 in response to determining that the first distance 417 (between the training embedding vector 437 and the training embedding vector 441) is less than the second distance 419 (between the training embedding vector 437 and the training embedding vector 445). In a particular aspect, the embedding network trainer 312, in response to determining that a size of the selected subset 624 satisfies a threshold, determines that training of the embedding network 105 based on the first training data is complete, uses the second training data at the checkpoint 606, refrains from additional training of the embedding network 105, provides the embedding network 105 to the speaker verifier 170 of FIG. 1, or a combination thereof.

The checkpoint 606 includes using the embedding network 105 of FIG. 1 to generate a data subset 626 and a filtered subset 628 corresponding to the third training data subset, at 625. In a particular example, the embedding network trainer 312 of FIG. 3 generates third training vector data (e.g., the training vector data 435 of FIG. 2) by using the embedding network 105 to process the third training data subset (e.g., the training data 405), as described with reference to FIG. 5. The embedding network trainer 312 generates the data subset 626 (e.g., the first subset of triplets 449) by performing the second triplet selection 530 based on the third training vector data (e.g., the training vector data 435), as described with reference to FIG. 5. The embedding network trainer 312 generates the filtered subset 628 (e.g., the first subset of triplets 449) by performing the first triplet selection 511 based on the third training vector data (e.g., the training vector data 435), as described with reference to FIG. 5.

The checkpoint 606 also includes determining whether the filtered subset is to be used to train the embedding network, at 629. For example, the embedding network trainer 312, in response to determining that the iteration count indicates an odd-numbered iteration, determines that the filtered subset is not to be used. Alternatively, the embedding network trainer 312, in response to determining that the iteration count indicates an even-numbered iteration, determines that the filtered subset is to be used.

The checkpoint 606 includes, in response to determining that the filtered subset is not to be used, at 629, training the embedding network using the data subset, at 630. For example, the embedding network trainer 312, in response to determining that the filtered subset is not to be used, determines first triplet losses (e.g., the triplet losses 503) based on the data subset 626 (e.g., the first subset of triplets 449), as described with reference to FIG. 5. The embedding network trainer 312 generates first weight values based on the first triplet losses (e.g., the triplet losses 503), as described with reference to the embedding network weight generation 510 of FIG. 5. The embedding network trainer 312 trains the embedding network 105 by updating, based on the first weight values, weights of nodes of the embedding network 105, as described with reference to FIG. 5.

The checkpoint 606, includes, in response to determining that the filtered subset is to be used, at 629, training the embedding network using the filtered subset, at 632. For example, the embedding network trainer 312, in response to determining that the filtered subset is to be used, determines second triplet losses (e.g., the triplet losses 503) based on the filtered subset 628 (e.g., the first subset of triplets 449), as described with reference to FIG. 5. The embedding network trainer 312 generates second weight values based on the second triplet losses (e.g., the triplet losses 503), as described with reference to the embedding network weight generation 510 of FIG. 5. The embedding network trainer 312 trains the embedding network 105 by updating, based on the second weight values, weights of nodes of the embedding network 105, as described with reference to FIG. 5.

The method 600 thus enables iterative training of the embedding network 105. In a particular aspect, accuracy of the embedding network 105 is improved faster (e.g., in fewer iterations) by using the filtered subsets to train the embedding network 105 during a first iteration prior to using the data subsets (e.g., random triplet selection data) to train the embedding network 105 during a subsequent iteration.

Figure 7:
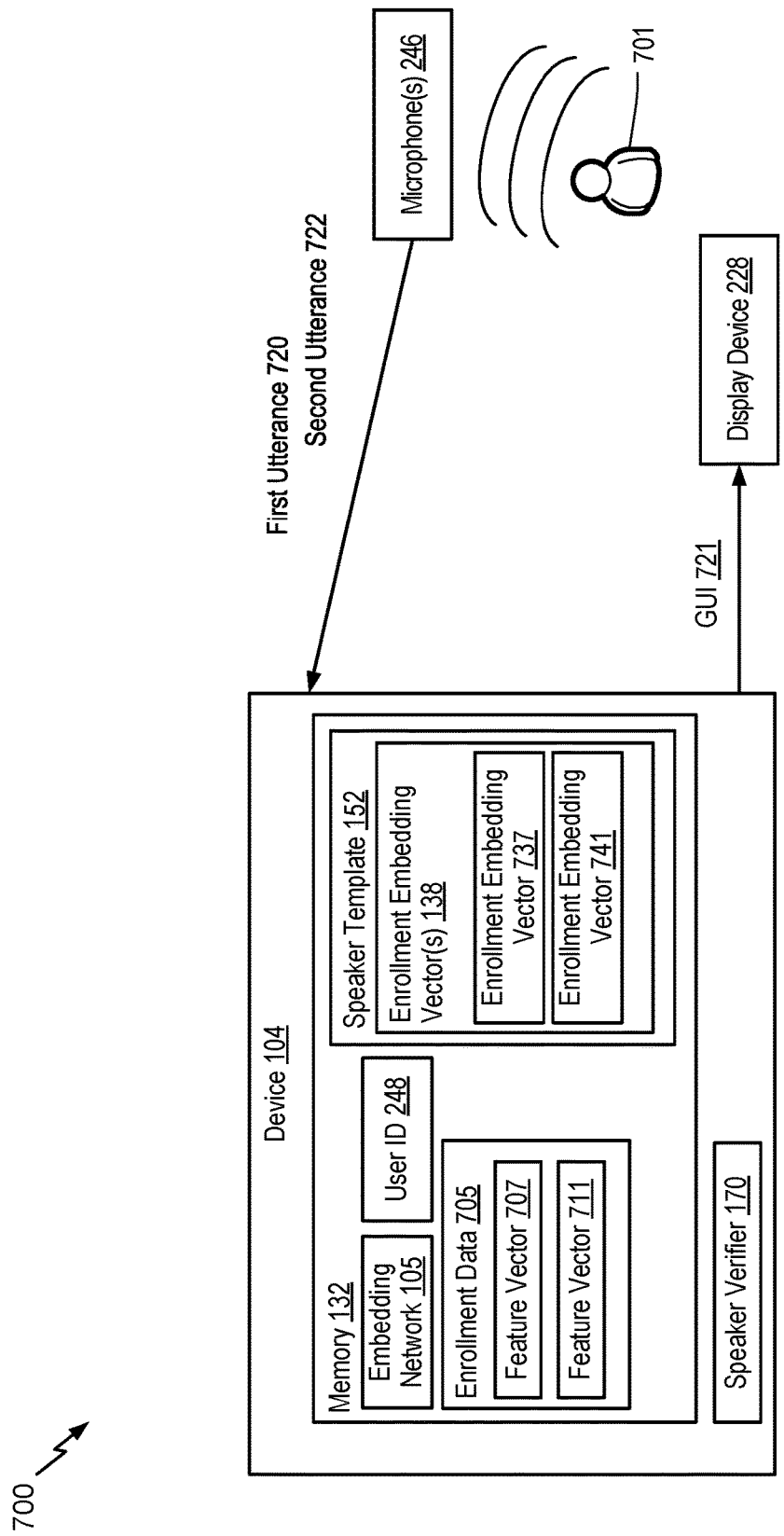
FIG. 7 is a diagram of a particular illustrative example of a system operable to perform speaker enrollment.

Referring to FIG. 7, a particular illustrative aspect of a system operable to perform speaker enrollment is shown and generally designated 700. In a particular aspect, the system 700 includes one or more components of the system 100 of FIG. 1, the system 200 of FIG. 2, the system 300 of FIG. 3, the system 400 of FIG. 4, or a combination thereof.

The embedding network trainer 312 generates the embedding network 105 by removing the speaker identification layer 326 from the classification network 303, as described with reference to FIG. 3. In a particular aspect, the embedding network trainer 312 performs additional training of the embedding network 105, as described with reference to FIGS. 4-6. The embedding network trainer 312 provides the embedding network 105 to the device 104, the speaker verifier 170, or both.

The speaker verifier 170 detects an enrollment period, as described with reference to FIG. 1. For example, the speaker verifier 170, upon activation, identifies an authorized user (e.g., a logged-in user, such as a user 701) of the device 104. The speaker verifier 170 determines whether the speaker template 152 associated with the authorized user (e.g., the user ID 248 of the user 701) is stored in the memory 132. The speaker verifier 170, in response to determining that the speaker template 152 is not stored in the memory 132 or that the speaker template 152 includes fewer than a threshold number of the enrollment embedding vectors 138, generates a first GUI (e.g., a GUI 721) including a first option to initiate an enrollment period. The speaker verifier 170 is configured to provide the first GUI (e.g., the GUI 721) to the display device 228. The speaker verifier 170, in response to receiving a user input indicating a selection of the first option, detects that an enrollment period has started, generate a second GUI (e.g., the GUI 721), or both. For example, the second GUI (e.g., the GUI 721) indicates that enrollment is in progress, that the device 104 is capturing audio, or both. The second GUI (e.g., the GUI 721) includes a second option to end the enrollment period. The speaker verifier 170 is configured to provide the second GUI (e.g., the GUI 721) to the display device 228.

The speaker verifier 170, during the enrollment period, receives utterances via the microphones 246 from the user 701 (e.g., the authorized user). For example, the speaker verifier 170 receives a first utterance 720 (e.g., a training utterance) from the microphones 246. The speaker verifier 170 receives a second utterance 722 (e.g., a training utterance) from the microphones 246. The speaker verifier 170 is configured to generate enrollment data 705 (e.g., initial user enrollment data) during the enrollment period (e.g., an initial enrollment period). For example, the speaker verifier 170 generates a feature vector 707 and a feature vector 711 indicating feature values extracted from the first utterance 720 and the second utterance 722, respectively.

In a particular aspect, the speaker verifier 170 designates the enrollment data 705 as associated with the user ID 248 associated with a logged-in user (e.g., the user 701). The speaker verifier 170 generates (e.g., initializes) the speaker template 152 based on the enrollment data 705. For example, the speaker verifier 170 generates the enrollment embedding vectors 138 by using the embedding network 105 to process the enrollment data 705. For example, the speaker verifier 170 generates an enrollment embedding vector 737 and an enrollment embedding vector 741 by processing the feature vector 707 and the feature vector 711, respectively. In a particular aspect, because the second GUI (e.g., the GUI 721) indicates that enrollment is in progress, the user 701 is likely to make an effort (e.g., turn off a television, move to a quiet location, etc.) to reduce extraneous noise during the enrollment period. The enrollment embedding vectors 138 are associated with a higher confidence of corresponding to utterances of the authorized user (e.g., the user 701) because of the reduced likelihood of extraneous noises being captured by the microphones 246.

In a particular aspect, generating the speaker template 152 during an enrollment period uses fewer utterances of the user 701 as compared to a number of utterances that would be used to train the classification network 303 to reliably identify speech of the user 701. For example, voice samples from many other users are used to train the embedding network 105 to produce embedding vectors that are closer to embedding vectors for the same speaker than to embedding vectors from other speakers. Voice samples of the user 701 are processed by the embedding network 105 to initialize the speaker template 152. The classification network 303 can be trained to process a voice sample of the user 701 and generate an output of the speaker identification layer 326 that indicates the user ID 248. The speaker template 152 can be initialized based on fewer voice samples of the user 701 than would be used to train the classification network 303 to indicate the user ID 248 upon processing voice samples of the user 701 and not upon processing voices samples of other users.

The speaker verifier 170, in response to receiving a user input indicating a selection of the second option of the second GUI, determining that the speaker template includes at least the threshold number of enrollment embedding vectors, or both, detects that the enrollment period has ended, generates a third GUI (e.g., the GUI 721), or both. For example, the third GUI (e.g., the GUI 721) indicates that the enrollment period has ended. The speaker verifier 170 provides the third GUI (e.g., the GUI 721) to the display device 228.

The system 700 thus enables using the embedding network 105 (e.g., the trained embedding network) to generate the speaker template 152. In a particular aspect, the enrollment embedding vectors 138 are generated based on relatively few utterances of the user 701. An embedding vector corresponding to a received utterance can be compared to the speaker template 152 to verify whether the received utterance is from the authorized user, as described with reference to FIG. 1. Because the enrollment embedding vectors are associated with a higher confidence of corresponding to utterances of the authorized user, the enrollment embedding vectors can be used to perform a model check of the speaker template 152, as described with reference to FIG. 2.

Figure 8:
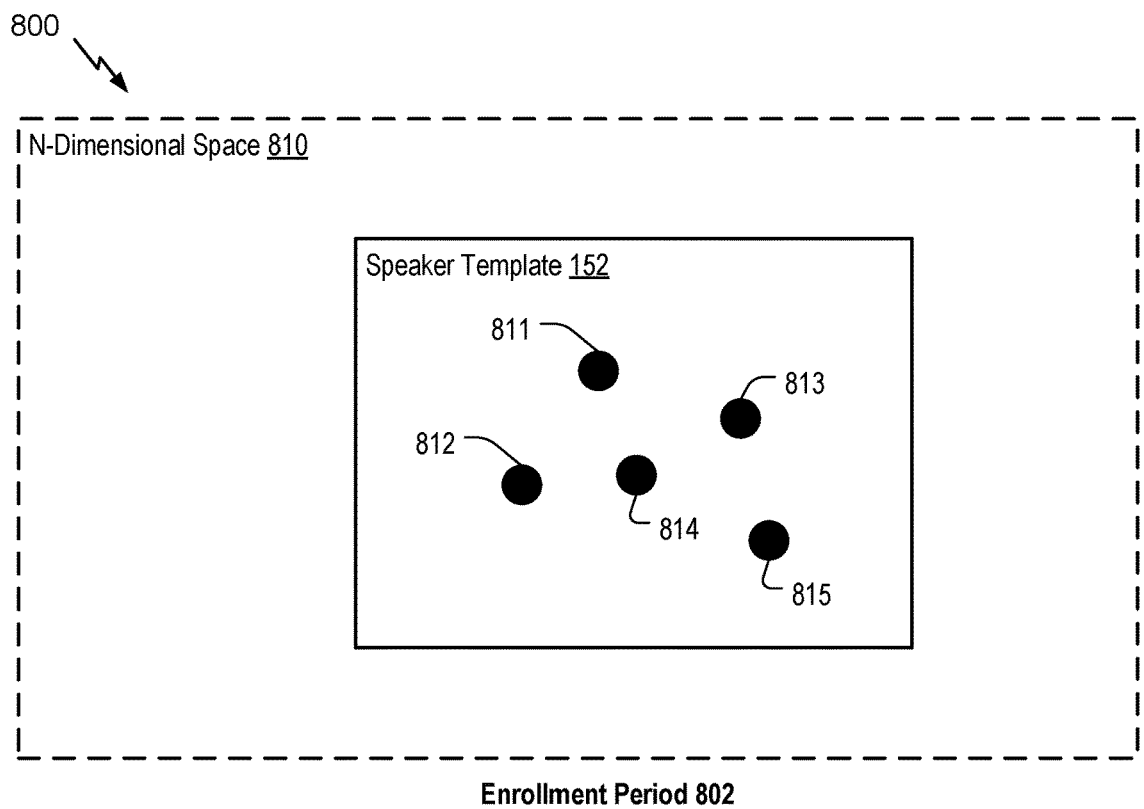
FIG. 8 is a diagram of a particular illustrative example of maintaining a speaker template.
Figure 8:
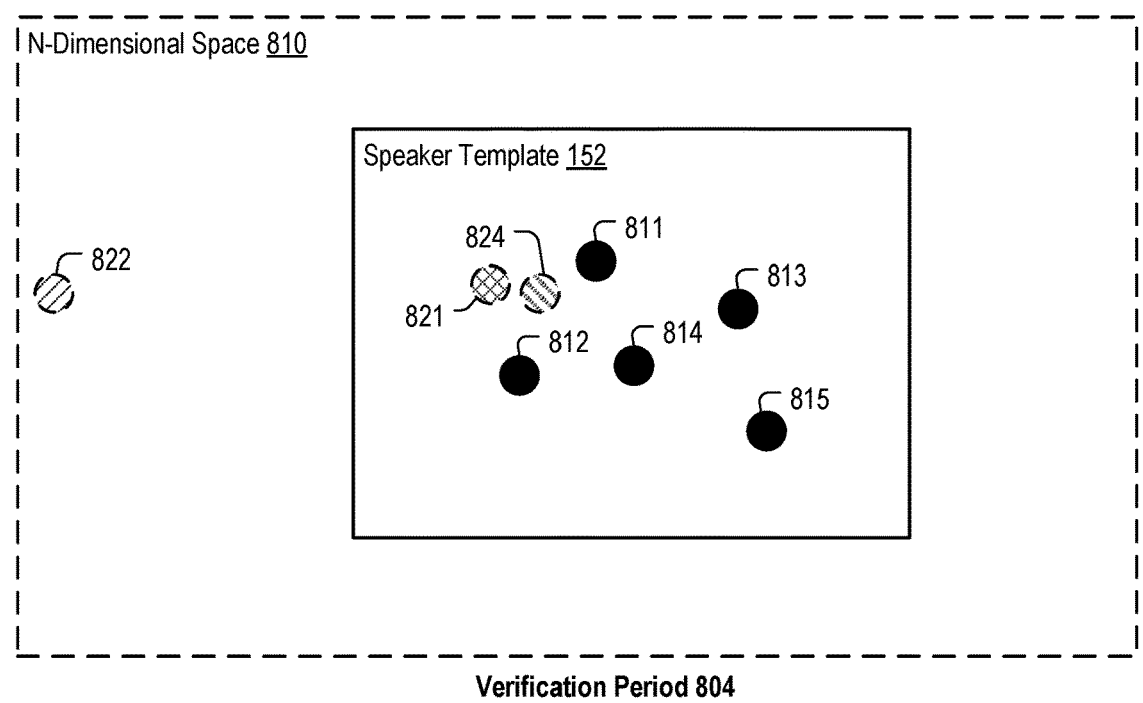

Referring to FIG. 8, a particular illustrative example of maintaining a speaker template is shown and generally designated 800.

The example 800 includes generating a speaker template during an enrollment period 802. For example, the speaker verifier 170 of FIG. 1 generates the speaker template 152 during the enrollment period 802, as described with reference to FIG. 7. The speaker template 152 includes the enrollment embedding vectors 138, as described with reference to FIGS. 1 and 7. For example, the enrollment embedding vectors 138 include an enrollment embedding vector 811, an enrollment embedding vector 812, an enrollment embedding vector 813, an enrollment embedding vector 814, an enrollment embedding vector 815, or a combination thereof. In a particular aspect, the enrollment embedding vector 737 of FIG. 7 corresponds to one of the enrollment embedding vectors 811-815 and the enrollment embedding vector 741 corresponds to another of the enrollment embedding vectors 811-815.

Each of the enrollment embedding vectors 811-815 represents a point in n-dimensional space 810. Because the enrollment embedding vectors 811-815 correspond to utterances of the same speaker (e.g., the user 701 of FIG. 1), the enrollment embedding vectors 811-815 are close to (e.g., within a threshold distance of) each other in the n-dimensional space 810.

The example 800 includes updating the speaker template during a verification period 804. In a particular aspect, the example 800 includes adding an embedding vector as a test embedding vector to the speaker template. To illustrate, the speaker verifier 170 receives an utterance (e.g., the first utterance 120 of FIG. 1) during the verification period 804. The speaker verifier 170 generates an embedding vector 821 (e.g., the first embedding vector 134) based on the utterance, as described with reference to FIG. 1. The speaker verifier 170 selectively adds the embedding vector 821 as a test embedding vector to the speaker template 152, as described with reference to FIG. 1. For example, the speaker verifier 170 determines a first verification distance metric (e.g., the verification distance metric 136) of the embedding vector 821, as described with reference to FIG. 1. In FIG. 8, the embedding vector 821 is illustrated as close to (e.g., within the speaker verification threshold 242 from) the embedding vectors 153 (e.g., the enrollment embedding vectors 811-815) of the speaker template 152. The speaker verifier 170, in response to determining that the first verification distance metric satisfies the speaker verification threshold 242 and that a count (e.g., 0) of the test embedding vectors 158 is less than the count threshold 260 (e.g., 1), adds the embedding vector 821 to the test embedding vectors 158 of the speaker template 152.

The example 800 also includes discarding an embedding vector. For example, the speaker verifier 170 receives an utterance (e.g., the first utterance 120 of FIG. 1) during the verification period 804. The speaker verifier 170 generates an embedding vector 822 (e.g., the first embedding vector 134) based on the utterance, as described with reference to FIG. 1. The speaker verifier 170 refrains from adding the embedding vector 822 as a test embedding vector to the speaker template 152, discards the embedding vector 822, or both, as described with reference to FIG. 1. For example, the speaker verifier 170 determines a second verification distance metric (e.g., the verification distance metric 136) of the embedding vector 822, as described with reference to FIG. 1. In FIG. 8, the embedding vector 822 is illustrated as far (e.g., outside the speaker verification threshold 242) from the embedding vectors 153 (e.g., the enrollment embedding vectors 811-815 and the embedding vector 821) of the speaker template 152. In a particular example, the embedding vector 822 is based on an audio input (e.g., an utterance) that is not from the authorized user (e.g., the user 701). To illustrate, the embedding vector 822 could be based on sounds from a television or speech of another user captured by the microphones 246. The speaker verifier 170, in response to determining that the second verification distance metric fails to satisfy the speaker verification threshold 242, refrains from adding the embedding vector 822 to the test embedding vectors 158, discards the embedding vector 822, or both.

The example 800 further includes replacing a first test embedding vector with a second test embedding vector in the speaker template 152. For example, the speaker verifier 170 receives an utterance (e.g., the first utterance 120 of FIG. 1) during the verification period 804. The speaker verifier 170 generates an embedding vector 824 (e.g., the first embedding vector 134) based on the utterance, as described with reference to FIG. 1. The speaker verifier 170 determines a third verification distance metric (e.g., the verification distance metric 136) of the embedding vector 824, as described with reference to FIG. 1. The speaker verifier 170 determines that the third verification distance metric satisfies the speaker verification threshold 242. In FIG. 8, the embedding vector 824 is illustrated as close to (e.g., within the speaker verification threshold 242 from) the embedding vectors 153 (e.g., the enrollment embedding vectors 811-815 and the embedding vector 821) of the speaker template 152.

The speaker verifier 170, in response to determining that a count (e.g., 2) of the test embedding vectors 158 fails to satisfy (e.g., is greater than or equal to) the count threshold 260 (e.g., 1), determines the test distance metric 144 of the embedding vector 821 (e.g., the test embedding vector 174) and determines the membership distance metric 156 of the embedding vector 824, as described with reference to FIG. 2. In FIG. 8, the embedding vector 824 is illustrated as closer (as compared to the embedding vector 821) to the enrollment embedding vectors 811-815 of the speaker template 152. The speaker verifier 170, in response to determining that the membership distance metric 156 of the embedding vector 824 is less than the test distance metric 144 of the embedding vector 821, adds the embedding vector 824 to the speaker template 152 and removes the embedding vector 821 from the speaker template 152.

The example 800 thus enables the speaker verifier 170 to initialize the speaker template 152 based on the enrollment embedding vectors 811-815 during the enrollment period 802. The example 800 enables improving accuracy of speaker verification during the verification period 804 by adding the embedding vector 821 that is verified to be from the user 701 (e.g., the authorized user) to the speaker template 152. Accuracy of speaker verification is further improved during the verification period 804 by replacing the embedding vector 821 with the embedding vector 824 that is verified to be from the user 701 (e.g., the authorized user) and closer (as compared to the embedding vector 821) to the enrollment embedding vectors 811-815. The ability to add embedding vectors during the verification period 804 improves user experience by shortening the enrollment period 802. For example, the speaker template 152 can be initialized based on fewer utterances of the user 701 received during the enrollment period 802.

Figure 9:
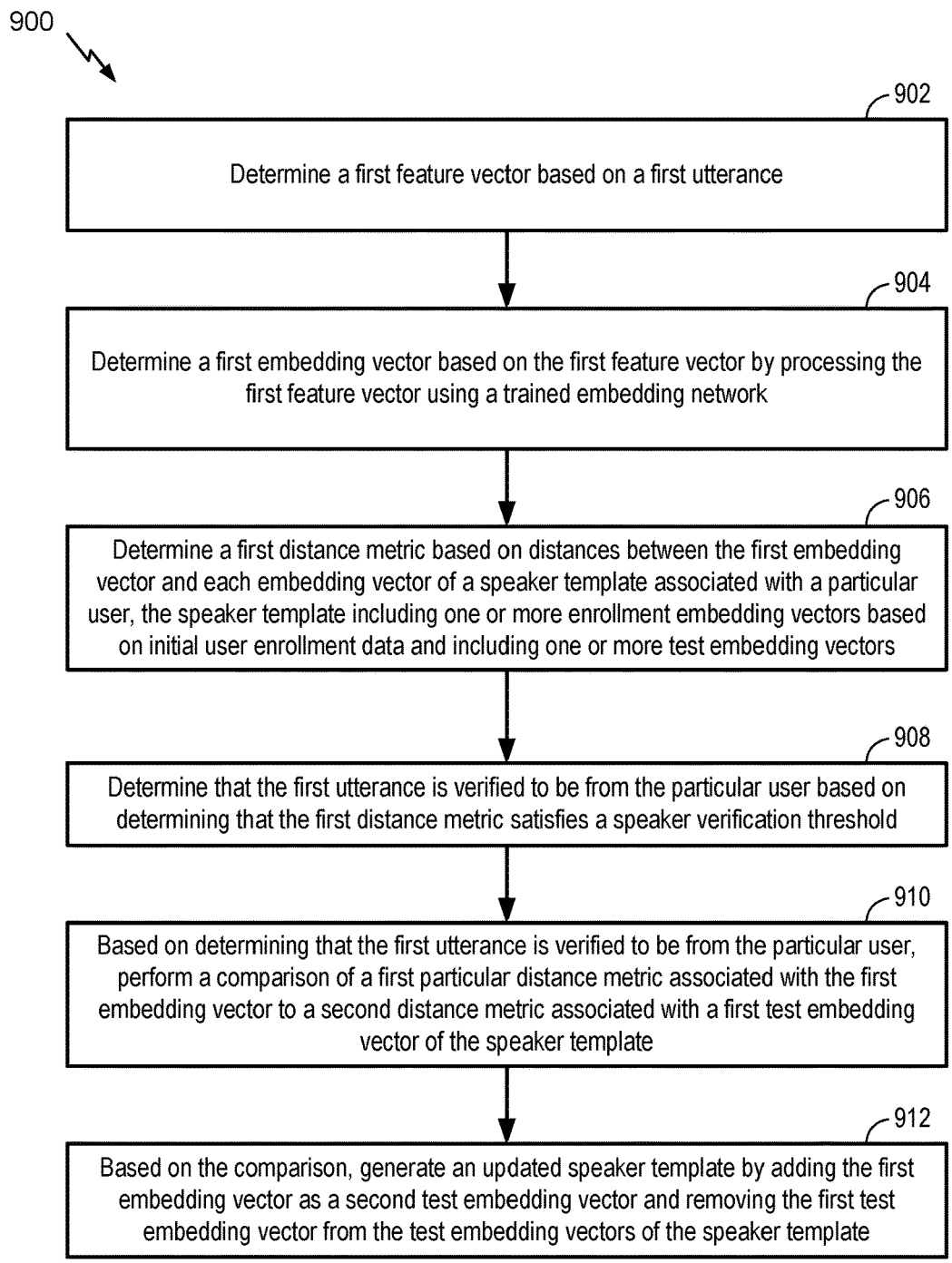
FIG. 9 is a diagram of a particular illustrative example of a method of speaker verification based on a speaker template.

FIG. 9 illustrates a method of speaker verification based on a speaker template is shown and generally designated 900. In a particular aspect, one or more operations of the method 900 are performed by the speaker verifier 170, the device 104, the system 100 of FIG. 1, the system 200 of FIG. 2, the system 700 of FIG. 7, or a combination thereof.

The method 900 includes determining a first feature vector based on a first utterance, at 902. For example, the speaker verifier 170 of FIG. 1 determines the first feature vector 145 based on the first utterance 120, as described with reference to FIG. 1.

The method 900 also includes determining a first embedding vector based on the first feature vector by processing the first feature vector using a trained embedding network, at 904. For example, the speaker verifier 170 of FIG. 1 determines the first embedding vector 134 based on the first feature vector 145 by processing the first feature vector 145 using the embedding network 105 (e.g., a trained embedding network), as described with reference to FIG. 1.

The method 900 further includes determining a first distance metric based on distances between the first embedding vector and each embedding vector of a speaker template associated with a particular user, at 906. For example, the speaker verifier 170 of FIG. 1 determines the verification distance metric 136 (e.g., a first distance metric) based on the distances 150 between the first embedding vector 134 and each embedding vector of the speaker template 152, as described with reference to FIG. 2. The speaker template 152 is associated with the user 701 of FIG. 7. The speaker template 152 includes the enrollment embedding vectors 138 based on the enrollment data 705 (e.g., initial user enrollment data) and includes the test embedding vectors 158.

The method 900 also includes determining that the first utterance is verified to be from the particular user based on determining that the first distance metric satisfies a speaker verification threshold, at 908. For example, the speaker verifier 170 of FIG. 1 determines that the first utterance 120 is verified to be from the user 701 based on determining that the verification distance metric 136 (e.g., the first distance metric) satisfies the speaker verification threshold 242, as described with reference to FIG. 2. For example, the embedding network 105 is trained to generate embedding vectors such that embedding vectors from the same user are within a verification distance (e.g., corresponding to the speaker verification threshold 242 of FIG. 2) of each other. To illustrate, there is a high likelihood of the first utterance 120 being from the user 701 if the verification distance metric 136 (e.g., based on the distances 150 between the first embedding vector 134 and each embedding vector of the speaker template 152) satisfies the speaker verification threshold 242.

The method 900 further includes, based on determining that the first utterance is verified to be from the particular user, performing a comparison of a first particular distance metric associated with the first embedding vector to a second distance metric associated with a first test embedding vector of the speaker template, at 910. For example, the speaker verifier 170 of FIG. 1, based on determining that the first utterance 120 is verified to be from the user 701, performs a comparison of the membership distance metric 156 (e.g., a first particular distance metric) associated with the first embedding vector 134 to the test distance metric 144 associated with the test embedding vector 174 of the speaker template 152, as described with reference to FIG. 2.

The method 900 also includes, based on the comparison, generating an updated speaker template by adding the first embedding vector as a second test embedding vector and removing the first test embedding vector from the test embedding vectors of the speaker template, at 912. For example, the speaker verifier 170 of FIG. 1, based on the comparison, generates an updated version of the speaker template 152 by adding the first embedding vector 134 as the test embedding vector 172 and removing the test embedding vector 174 from the speaker template 152, as described with reference to FIG. 2.

The method 900 thus improves accuracy of speaker verification by adding the test embedding vectors 158 to the speaker template 152 that are verified to be from the authorized user. Accuracy of the speaker template is also improved over time by replacing test embedding vectors when utterances corresponding to "better" embedding vectors (e.g., closer to the enrollment embedding vectors) are received.

Figure 10:
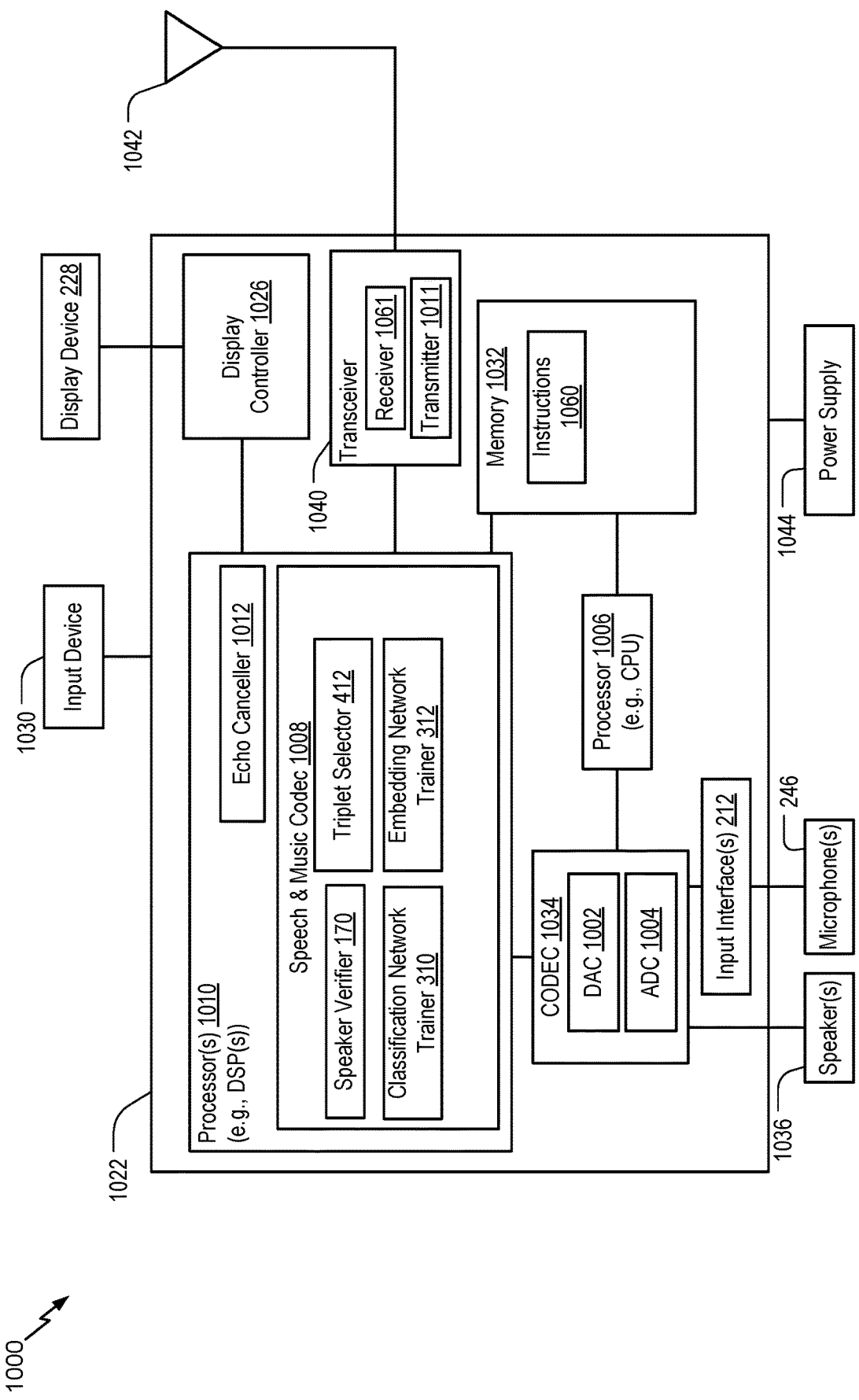
FIG. 10 is a block diagram of a particular illustrative example of a device that is operable to perform speaker verification based on a speaker template.

Referring to FIG. 10, a block diagram of a particular illustrative example of a device (e.g., a wireless communication device, a home device, an internet of things (IOT) device, a voice-activated digital assistant, or a combination thereof) is depicted and generally designated 1000. In various examples, the device 1000 includes fewer or more components than illustrated in FIG. 10. In an illustrative example, the device 1000 corresponds to the device 104 of FIG. 1, the device 304 of FIG. 3, or both. In an illustrative example, the device 1000 performs one or more operations described with reference to FIGS. 1-9.

In a particular aspect, the device 1000 includes a processor 1006 (e.g., a central processing unit (CPU)). The device 1000 may include one or more additional processors 1010 (e.g., one or more digital signal processors (DSPs)). The processors 1010 include a speech and music coder-decoder (CODEC) 1008, an echo canceller 1012, or both. The speech and music CODEC 1008 includes the speaker verifier 170, the classification network trainer 310, the embedding network trainer 312, the triplet selector 412, or a combination thereof. The processors 1010 are coupled via a transceiver 1040 to an antenna 1042. The transceiver 1040 includes a receiver 1061, a transmitter 1011, or both.

Although the speech and music CODEC 1008 is illustrated as a component of the processors 1010, in other examples one or more components of the speech and music CODEC 1008 are included in the processor 1006, a CODEC 1034, another processing component, or a combination thereof. The device 1000 also includes a memory 1032. In a particular implementation, the memory 1032 includes the memory 132 of FIG. 1, the memory 332 of FIG. 3, or both. The device 1000 includes a display 228 coupled to a display controller 1026. One or more speakers 1036, the microphones 246, or a combination thereof may be coupled to the CODEC 1034. The CODEC 1034 may include a digital-to-analog converter (DAC) 1002 and an analog-to-digital converter (ADC) 1004.

In a particular aspect, the CODEC 1034 may receive analog signals from the microphones 246, convert the analog signals to digital signals using the analog-to-digital converter 1004, and provide the digital signals to the speech and music CODEC 1008, such as in a pulse code modulation (PCM) format. The speech and music CODEC 1008 may process the digital signals. In a particular aspect, the speech and music CODEC 1008 may provide digital signals to the CODEC 1034. The CODEC 1034 may convert the digital signals to analog signals using the digital-to-analog converter 1002 and may provide the analog signals to the speakers 1036.

The memory 1032 may include instructions 1060 executable by the processor 1006, the processors 1010, the CODEC 1034, the speaker verifier 170, the classification network trainer 310, the embedding network trainer 312, the triplet selector 412, another processing unit of the device 1000, or a combination thereof, to perform methods and processes disclosed herein, such as one or more operations described with reference to FIGS. 1-9. One or more components of the systems and devices described with reference to FIGS. 1-9 may be implemented via dedicated hardware (e.g., circuitry), by a processor executing instructions (e.g., the instructions 1060) to perform one or more tasks, or a combination thereof. As an example, the memory 1032 or one or more components of the processor 1006, the processors 1010, the speaker verifier 170, the classification network trainer 310, the embedding network trainer 312, the triplet selector 412, and/or the CODEC 1034 includes a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device include, instructions (e.g., the instructions 1060) that, when executed by a computer (e.g., a processor in the CODEC 1034, the speaker verifier 170, the classification network trainer 310, the embedding network trainer 312, the triplet selector 412, the processor 1006, and/or the processors 1010), causes the computer to perform one or more operations described with reference to FIGS. 1-9. As an example, the memory 1032 or the one or more components of the processor 1006, the processors 1010, the speaker verifier 170, the classification network trainer 310, the embedding network trainer 312, the triplet selector 412, the CODEC 1034 is a computer-readable storage device that includes instructions (e.g., the instructions 1060) that, when executed by a computer (e.g., a processor in the CODEC 1034, the processor 1006, and/or the processor 1010), cause the computer to perform one or more operations described with reference to FIGS. 1-9.

In a particular aspect, the device 1000 is included in a system-in-package or system-on-chip device 1022, such as a mobile station modem (MSM). In a particular aspect, the processor 1006, the processors 1010, the display controller 1026, the memory 1032, the CODEC 1034, the speaker verifier 170, the classification network trainer 310, the embedding network trainer 312, the triplet selector 412, and the transceiver 1040 are included in a system-in-package or the system-on-chip device 1022. In a particular aspect, an input device 1030, such as a touchscreen and/or keypad, and a power supply 1044 are coupled to the system-on-chip device 1022. Moreover, in a particular aspect, as illustrated in FIG. 10, the display 228, the input device 1030, the speaker 1036, the microphones 246, the antenna 1042, and the power supply 1044 are external to the system-on-chip device 1022. However, each of the display 228, the input device 1030, the speakers 1036, the microphones 246, the antenna 1042, and the power supply 1044 can be coupled to a component of the system-on-chip device 1022, such as an interface or a controller. In an illustrative example, the device 1000 corresponds to a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a mobile communication device, a mobile phone, a smartphone, a cellular phone, a laptop computer, a tablet computer, a personal digital assistant (PDA), a display device, an optical disc player, a tuner, a decoder, an encoder system, a base station, a set top box, or any combination thereof.

In an illustrative aspect, the processors 1010 are operable to perform speaker verification in accordance with the described techniques. For example, the speaker verifier 170 receives the first utterance 120 from the microphones 246. The speaker verifier 170 generates the first feature vector 145 based on the first utterance 120. The speaker verifier 170 generates the first embedding vector 134 by using the embedding network 105 to process the first feature vector 145. The speaker verifier 170 determines the verification distance metric 136 based on the distances 150 between the first embedding vector 134 and each of the test embedding vectors 158. The speaker verifier 170 determines whether the first utterance 120 is verified to be from the user 701 (e.g., an authorized user) based on whether the verification distance metric 136 satisfies the speaker verification threshold 242. The speaker verifier 170, in response to determining that the first utterance 120 is verified to be from the user 701, updates the speaker template 152 by adding the first embedding vector 134 as the test embedding vector 172 to the test embedding vectors 158.

In conjunction with the described aspects, an apparatus is disclosed that includes means for storing a trained embedding network. For example, the means for storing include the memory 132, the device 104, the system 100 of FIG. 1, the system 200 of FIG. 2, the memory 332, the device 304, the system 300 of FIG. 3, the system 400 of FIG. 4, one or more devices configured to store a trained embedding network (e.g., a computer-readable storage device), or any combination thereof.

The apparatus also includes means for storing a speaker template associated with a particular user. For example, the means for storing include the memory 132, the device 104, the system 100 of FIG. 1, the system 200 of FIG. 2, the memory 332, the device 304, the system 300 of FIG. 3, the system 400 of FIG. 4, one or more devices configured to store a speaker template (e.g., a computer-readable storage device), or any combination thereof. The speaker template 152 of FIG. 1 includes the enrollment embedding vectors 138 based on the enrollment data 705 of FIG. 7 (e.g., initial user enrollment data). In a particular aspect, the speaker template 152 also includes the test embedding vectors 158.

The apparatus further includes means for determining a first feature vector based on a first utterance. For example, the means for determining include the speaker verifier 170, the device 104, the system 100 of FIG. 1, the system 200 of FIG. 2, one or more devices configured to determine a first feature vector (e.g., a processor executing instructions stored at a computer-readable storage device), or any combination thereof.

The apparatus also includes means for determining a first embedding vector based on the first feature vector by processing the first feature vector using the trained embedding network. For example, the means for determining include the speaker verifier 170, the device 104, the system 100 of FIG. 1, the system 200 of FIG. 2, one or more devices configured to determine a first embedding network (e.g., a processor executing instructions stored at a computer-readable storage device), or any combination thereof.

The apparatus further includes means for determining a first distance metric based on distances between the first embedding vector and each embedding vector of the speaker template. For example, the means for determining include the speaker verifier 170, the device 104, the system 100 of FIG. 1, the system 200 of FIG. 2, one or more devices configured to determine a first distance metric (e.g., a processor executing instructions stored at a computer-readable storage device), or any combination thereof.

The apparatus also includes means for performing a speaker verification operation to determine, based on the first distance metric, whether the first utterance is verified to be from the particular user. For example, the means for performing a speaker verification include the speaker verifier 170, the device 104, the system 100 of FIG. 1, the system 200 of FIG. 2, one or more devices configured to perform a speaker verification (e.g., a processor executing instructions stored at a computer-readable storage device), or any combination thereof.

The apparatus further includes means for performing a comparison of a first particular distance metric associated with the first embedding vector to a second distance metric associated with a first test embedding vector of the speaker template. For example, the means for performing a comparison include the speaker verifier 170, the device 104, the system 100 of FIG. 1, the system 200 of FIG. 2, one or more devices configured to perform a comparison (e.g., a processor executing instructions stored at a computer-readable storage device), or any combination thereof. The comparison is performed based on determining that the first utterance 120 is verified to be from the user 701.

The apparatus also includes means for generating an updated speaker template by adding the first embedding vector as a second test embedding vector and removing the first test embedding vector from the test embedding vectors of the speaker template. For example, the means for generating include the speaker verifier 170, the device 104, the system 100 of FIG. 1, the system 200 of FIG. 2, one or more devices configured to generate an updated speaker template (e.g., a processor executing instructions stored at a computer-readable storage device), or any combination thereof. The updated version of the speaker template 152 is generated based on the comparison.

Particular aspects of the present disclosure are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a memory configured to store:
a trained embedding network; and
a speaker template associated with a first user, the speaker template including one or more enrollment embedding vectors based on initial user enrollment data and including one or more test embedding vectors; and
a processor coupled to the memory, the processor configured to:
determine a first feature vector based on a first utterance;
determine a first embedding vector based on the first feature vector by processing the first feature vector using the trained embedding network;
determine a first distance metric based on distances between the first embedding vector and each embedding vector of the speaker template;
perform a speaker verification operation to determine, based on the first distance metric, whether the first utterance is verified to be from the first user;
based on determining that the first utterance is verified to be from the first user, perform a comparison of a first particular distance metric associated with the first embedding vector to a second distance metric associated with a first test embedding vector of the speaker template;
based on the comparison, generate an updated speaker template by adding the first embedding vector as a second test embedding vector and removing the first test embedding vector from the test embedding vectors of the speaker template;
generate a set of triplets based on training embedding vectors associated with a second user, a particular triplet including a first training embedding vector associated with a first training utterance of the first user, a second training embedding vector associated with a second training utterance of the first user, and a third training embedding vector associated with a third training utterance of the second user;
determine distance metrics corresponding to the set of triplets, a first distance metric of the particular triplet based on a difference between a first distance and a second distance, wherein the first distance is between the first training embedding vector and the second training embedding vector, and wherein the second distance is between the first training embedding vector and the third training embedding vector;
select a first subset of the set of triplets based on the distance metrics, the particular triplet selected in the first subset based on determining that the first distance metric satisfies a tolerance threshold; and
generate the trained embedding network by training the embedding network using the first subset of the set of triplets prior to training the embedding network using one or more remaining subsets of the set of triplets.

2. The device of claim 1, wherein the processor is configured to determine that the first utterance is verified to be from the first user based on determining that the first distance metric satisfies a speaker verification threshold.

3. The device of claim 1, wherein the processor is further configured to determine the first particular distance metric based on second distances between the first embedding vector and each of the enrollment embedding vectors of the speaker template.

4. The device of claim 1, wherein the processor is configured to update the speaker template based on determining that the first particular distance metric is less than the second distance metric.

5. The device of claim 1, wherein the second distance metric of the first test embedding vector is highest among distance metrics associated with the test embedding vectors.

6. The device of claim 1, further comprising a microphone coupled to the processor, the microphone configured to receive the first utterance.

7. The device of claim 1, wherein the processor is configured to:
generate the initial user enrollment data during an initial enrollment period; and
generate the test embedding vectors based on utterances received during a verification period that is subsequent to the initial enrollment period.

8. The device of claim 1, wherein the processor is configured to, based on determining that a count of the test embedding vectors fails to satisfy a count threshold, perform the comparison of the first particular distance metric to the second distance metric.

9. The device of claim 1, wherein the processor is configured to, subsequent to generating the updated speaker template and based on determining that a model check condition is satisfied, generate a third distance metric for the second test embedding vector, the third distance metric based on distances between the second test embedding vector and each of the enrollment embedding vectors.

10. The device of claim 9, wherein the processor is configured to, based on determining that the third distance metric fails to satisfy a trusted distance threshold, generate an alert requesting re-enrollment of the first user.

11. The device of claim 9, wherein the processor is configured to, based on determining that the third distance metric fails to satisfy a trusted distance threshold, modify the speaker template by removing the test embedding vectors from the speaker template.

12. The device of claim 9, wherein the processor is configured to determine that the model check condition is satisfied based on determining that a count of the test embedding vectors is greater than or equal to a first threshold, detecting expiration of a model check time period, determining that a count of processed utterances is greater than or equal to a second threshold, or a combination thereof.

13. A method of speaker verification, the method comprising:
   determining, at a device, a first feature vector based on a first utterance of a first user;
   determining, at the device, a first embedding vector based on the first feature vector by processing the first feature vector using a trained embedding network;
   determining, at the device, a first distance metric based on distances between the first embedding vector and each embedding vector of a speaker template associated with the first user, the speaker template including one or more enrollment embedding vectors based on initial user enrollment data and including one or more test embedding vectors;
   determining, at the device, that the first utterance is verified to be from the first user based on determining that the first distance metric satisfies a speaker verification threshold;
   based on determining that the first utterance is verified to be from the first user, performing a comparison of a first particular distance metric associated with the first embedding vector to a second distance metric associated with a first test embedding vector of the speaker template;
   based on the comparison, generating an updated speaker template by adding the first embedding vector as a second test embedding vector and removing the first test embedding vector from the test embedding vectors of the speaker template;
   generating a set of triplets based on training embedding vectors associated with a second user, a particular triplet including a first training embedding vector associated with a first training utterance of the first user, a second training embedding vector associated with a second training utterance of the first user, and a third training embedding vector associated with a third training utterance of the second user;
   determining distance metrics corresponding to the set of triplets, a first distance metric of the particular triplet based on a difference between a first distance and a second distance, wherein the first distance is between the first training embedding vector and the second training embedding vector, and wherein the second distance is between the first training embedding vector and the third training embedding vector;
   selecting a first subset of the set of triplets based on the distance metrics, the particular triplet selected in the first subset based on determining that the first distance metric satisfies a tolerance threshold; and
   generating the trained embedding network by training the embedding network using the first subset of the set of triplets prior to training the embedding network using one or more remaining subsets of the set of triplets.

14. The method of claim 13, further comprising:
   determining, at the device, a second feature vector based on a second utterance;
   determining, at the device, a second embedding vector based on the second feature vector by processing the second feature vector using the trained embedding network;
   determining, at the device, a third distance metric based on distances between the second embedding vector and each embedding vector of the updated speaker template; and
   determining, based on the third distance metric, that the second utterance is not verified to be from the first user.

15. The method of claim 13, further comprising:
   determining, at the device, a second feature vector based on a second utterance;
   determining, at the device, a second embedding vector based on the second feature vector by processing the second feature vector using the trained embedding network;
   determining, at the device, a third distance metric based on distances between the second embedding vector and each embedding vector of the updated speaker template;
   determining, based on the third distance metric, that the second utterance is verified to be from the first user; and
   based on determining that the second utterance is verified to be from the first user and determining that a count of the test embedding vectors of the updated speaker template satisfies a count threshold, adding the second utterance as a third test embedding vector to the test embedding vectors of the updated speaker template.

16. The method of claim 13, further comprising:
   determining, at the device, a second feature vector based on a second utterance;
   determining, at the device, a second embedding vector based on the second feature vector by processing the second feature vector using the trained embedding network;
   determining, at the device, a third distance metric based on distances between the second embedding vector and each embedding vector of the updated speaker template;
   determining, based on the third distance metric, that the second utterance is verified to be from the first user;
   based on determining that the second utterance is verified to be from the first user and determining that a count of the test embedding vectors of the updated speaker template fails to satisfy a count threshold, performing a second comparison of a third particular distance metric associated with the second embedding vector to a fourth distance metric associated with a fourth test embedding vector of the updated speaker template; and
   based on the second comparison, refraining from adding the second embedding vector to the updated speaker template.

17. The method of claim 13, further comprising, prior to determining the training embedding vectors, generating the embedding network by removing an output layer from a classification network.

18. The method of claim 13, further comprising, subsequent to training the embedding network using the one or more remaining subsets of the set of triplets, training the embedding network using the set of the triplets.

19. The method of claim 13, further comprising:
   generating, at the device, the initial user enrollment data during an initial enrollment period; and determining, at the device, the test embedding vectors based on utterances received during a verification period that is subsequent to the initial enrollment period.

20. The method of claim 13, further comprising, subsequent to generating the updated speaker template and based on determining that a model check condition is satisfied, generating a third distance metric for the second test embedding vector, the third distance metric based on distances between the second test embedding vector and each of the enrollment embedding vectors.

21. The method of claim 20, further comprising, based on determining that the third distance metric fails to satisfy a trusted distance threshold, generating an alert requesting re-enrollment of the first user.

22. The method of claim 20, further comprising, based on determining that the third distance metric fails to satisfy a trusted distance threshold, modifying the speaker template by removing the test embedding vectors from the speaker template.

23. The method of claim 20, further comprising determining, at the device, that the model check condition is satisfied based on determining that a count of the test embedding vectors is greater than or equal to a first threshold, detecting expiration of a model check time period, determining that a count of processed utterances is greater than or equal to a second threshold, or a combination thereof.

24. A computer-readable storage device storing instructions that, when executed by a processor, cause the processor to perform operations comprising:
   determining a first feature vector based on a first utterance;
   determining a first embedding vector based on the first feature vector by processing the first feature vector using a trained embedding network;
   determining a first distance metric based on distances between the first embedding vector and each embedding vector of a speaker template associated with a first user, the speaker template including one or more enrollment embedding vectors based on initial user enrollment data and including one or more test embedding vectors;
   performing a speaker verification operation to determine, based on the first distance metric, whether the first utterance is verified to be from the first user;
   based on determining that the first utterance is verified to be from the first user, performing a comparison of a first particular distance metric associated with the first embedding vector to a second distance metric associated with a first test embedding vector of the speaker template;
   based on the comparison, generating an updated speaker template by adding the first embedding vector as a second test embedding vector and removing the first test embedding vector from the test embedding vectors of the speaker template;
   generating a set of triplets based on training embedding vectors associated with a second user, a particular triplet including a first training embedding vector associated with a first training utterance of the first user, a second training embedding vector associated with a second training utterance of the first user, and a third training embedding vector associated with a third training utterance of the second user;
   determining distance metrics corresponding to the set of triplets, a first distance metric of the particular triplet based on a difference between a first distance and a second distance, wherein the first distance is between the first training embedding vector and the second training embedding vector, and wherein the second distance is between the first training embedding vector and the third training embedding vector;
   selecting a first subset of the set of triplets based on the distance metrics, the particular triplet selected in the first subset based on determining that the first distance metric satisfies a tolerance threshold; and
   generating the trained embedding network by training the embedding network using the first subset of the set of triplets prior to training the embedding network using one or more remaining subsets of the set of triplets.

25. The computer-readable storage device of claim 24, wherein the operations further comprise determining that the first utterance is verified to be from the first user based on determining that the first distance metric satisfies a speaker verification threshold.

26. The computer-readable storage device of claim 24, wherein the second distance metric of the first test embedding vector is highest among distance metrics associated with the test embedding vectors.

27. An apparatus comprising:
   means for storing a trained embedding network;
   means for storing a speaker template associated with a first user, the speaker template including one or more enrollment embedding vectors based on initial user enrollment data and including one or more test embedding vectors;
   means for determining a first feature vector based on a first utterance;
   means for determining a first embedding vector based on the first feature vector by processing the first feature vector using the trained embedding network;
   means for determining a first distance metric based on distances between the first embedding vector and each embedding vector of the speaker template;
   means for performing a speaker verification operation to determine, based on the first distance metric, whether the first utterance is verified to be from the first user;
   means for performing a comparison of a first particular distance metric associated with the first embedding vector to a second distance metric associated with a first test embedding vector of the speaker template, the comparison performed based on determining that the first utterance is verified to be from the first user; and
   means for generating an updated speaker template by adding the first embedding vector as a second test embedding vector and removing the first test embedding vector from the test embedding vectors of the speaker template, the updated speaker template generated based on the comparison;
   means for generating a set of triplets based on training embedding vectors associated with a second user, a particular triplet including a first training embedding vector associated with a first training utterance of the first user, a second training embedding vector associated with a second training utterance of the first user, and a third training embedding vector associated with a third training utterance of the second user;
   means for determining distance metrics corresponding to the set of triplets, a first distance metric of the particular triplet based on a difference between a first distance and a second distance, wherein the first distance is between the first training embedding vector and the second training embedding vector, and wherein the second distance is between the first training embedding vector and the third training embedding vector;

means for selecting a first subset of the set of triplets based on the distance metrics, the particular triplet selected in the first subset based on determining that the first distance metric satisfies a tolerance threshold; and means for generating the trained embedding network by training the embedding network using the first subset of the set of triplets prior to training the embedding network using one or more remaining subsets of the set of triplets.

28. The apparatus of claim 27, wherein the means for storing the trained embedding network, the means for storing the speaker template, the means for determining the first feature vector, the means for determining the first embedding vector, the means for determining the first distance metric, the means for performing the speaker verification operation, and means for performing the comparison are integrated into at least one of a virtual assistant, a home appliance, a smart device, an internet of things (IoT) device, a mobile phone, base station, a communication device, a computer, a music player, a video player, an entertainment unit, a navigation device, a personal digital assistant (PDA), a decoder, or a set top box.

* * * * *